US008320748B2

(12) United States Patent
Itoh et al.

(10) Patent No.: US 8,320,748 B2
(45) Date of Patent: *Nov. 27, 2012

(54) AUDIO/VIDEO INFORMATION RECORDING/REPRODUCING DEVICE AND METHOD THEREFOR

(75) Inventors: Masanori Itoh, Osaka (JP); Masafumi Shimotashiro, Osaka (JP)

(73) Assignee: Panasonic Corporation, Osaka (JP)

( * ) Notice: Subject to any disclaimer, the term of this patent is extended or adjusted under 35 U.S.C. 154(b) by 1137 days.

This patent is subject to a terminal disclaimer.

(21) Appl. No.: 12/119,128

(22) Filed: May 12, 2008

(65) Prior Publication Data

US 2008/0219644 A1 Sep. 11, 2008

Related U.S. Application Data

(63) Continuation of application No. 10/380,713, filed as application No. PCT/JP01/08045 on Sep. 17, 2001, now Pat. No. 7,386,222.

(30) Foreign Application Priority Data

Sep. 18, 2000 (JP) ................................ 2000-281554

(51) Int. Cl.
*H04N 5/92* (2006.01)
*H04N 5/78* (2006.01)
*H04N 5/89* (2006.01)
*H04N 5/765* (2006.01)
*H04N 5/917* (2006.01)
*G11B 5/09* (2006.01)
*G11B 11/00* (2006.01)

(52) U.S. Cl. ........ 386/338; 386/200; 386/324; 386/328; 386/334; 369/47.1; 369/53.35

(58) Field of Classification Search .................... 386/96, 386/33, 45, 46, 95, 112, 126; 369/47.1, 53.35

See application file for complete search history.

(56) References Cited

U.S. PATENT DOCUMENTS 5,227,929 A * 7/1993 Comerford ..................... 360/75
(Continued)

FOREIGN PATENT DOCUMENTS
EP 0866446 9/1998
(Continued)

OTHER PUBLICATIONS

"ISO/IEC 13818-1. Information Technology—General Coding of Moving Pictures and Associated Audio: Systems. Recommendation H.222.0 (ISO/IEC JTC1/SC29/WG11 N0801)"; vol. 13818-1, Nov. 13, 1994; p. 155pp; XP007911297.

*Primary Examiner* — Thai Tran
*Assistant Examiner* — Syed Hasan
(74) *Attorney, Agent, or Firm* — Hamre, Schumann, Mueller & Larson, P.C.

(57) ABSTRACT

An audio/video information recording/reproducing device capable of easily implementing a post-recording function on an optical disk by using even a low-cost disk drive having a comparatively low-speed seek time. When recording a video file, it is recorded on an optical disk continuously for a duration equivalent to more than three times a seek time. When recording dubbing audio, it is recorded continuously only with constant data size at the same time with the reproducing of the recorded video file, thereby enabling concurrent real-time continuous reproducing and recording. Accordingly, concurrent reproductions of a video file and an audio file are ensured when reproducing dubbing audio.

5 Claims, 23 Drawing Sheets

U.S. PATENT DOCUMENTS

| | | | |
|---|---|---|---|
| 5,257,143 A * | 10/1993 | Zangenehpour | 360/48 |
| 5,471,450 A * | 11/1995 | Yonemitsu et al. | 369/47.49 |
| 5,742,583 A * | 4/1998 | Scott | 370/342 |
| 6,219,311 B1 | 4/2001 | Mitsuno | |
| 6,240,244 B1 | 5/2001 | Ikeda | |
| 6,324,334 B1 * | 11/2001 | Morioka et al. | 386/52 |
| 6,526,217 B1 | 2/2003 | Fujinami | |
| 6,542,695 B1 * | 4/2003 | Akiba et al. | 386/125 |
| 6,564,009 B2 * | 5/2003 | Owa et al. | 386/126 |
| 6,580,873 B2 * | 6/2003 | Ando et al. | 386/95 |
| 6,760,542 B1 * | 7/2004 | Saeijs et al. | 386/125 |
| 6,826,132 B2 | 11/2004 | Mitsuno | |
| 2005/0259954 A1 * | 11/2005 | Ando et al. | 386/46 |

FOREIGN PATENT DOCUMENTS

| | | |
|---|---|---|
| EP | 0 965 991 | 12/1999 |
| EP | 1 014 718 | 6/2000 |
| JP | 11-144378 | 5/1999 |
| JP | 11-168693 | 6/1999 |
| JP | 2000-4421 | 1/2000 |
| JP | 2000-023102 | 1/2000 |
| JP | 2000-197005 | 7/2000 |
| WO | WO 99/13469 | 3/1999 |

* cited by examiner

AUDIO/VIDEO INFORMATION RECORDING/REPRODUCING DEVICE AND METHOD THEREFOR

CROSS-REFERENCE TO RELATED APPLICATIONS

This application is a Continuation of application Ser. No. 10/380,713, filed Mar. 18, 2003, which is a U.S. National Stage of Application No. PCT/JP01/08045, filed Sep. 17, 2001, which applications are incorporated herein by reference.

TECHNICAL FIELD

The present invention relates to an audio/video information recording/reproducing device and method compressing video signals and audio signals and recording the signals on a recording medium such as an optical disk.

BACKGROUND ART

System streams defined by the MPEG2 standard (ISO/IEC 13818-1) are used to compress video at a low bit rate. The following three types are defined as this system stream: program stream; transport stream; and PES stream.

On the other hand, optical disks such as phase-change optical disk (e.g., DVD-RAM or MVDISC) or magneto-optical disks (MO) have attracted attention as a recording medium replacing a magnetic tape. For example, VIDEO RECORDING standard (DVD Specifications for Rewritable/Re-recordable Discs Part 3 VIDEO RECORDING Version 1.0 September 1999) is one standard under which video is recorded on a DVD-RAM. This standard is used to record/reproduce video files constituted by program streams under the MPEG2 standard with respect to a DVD-RAM disk. Hereinafter, conventional techniques including the technique of the VIDEO RECORDING standard will be described by explaining the case where video files constituted by MPEG2 transport streams are recoded/reproduced with respect to a phase-change disk (hereinafter, referred to simply as "optical disk" as long as it is not confusing) instead. In the description below, video is compressed under the MPEG2 of ISO/IEC 13818-1, and audio is compressed under the MPEG2-AAC (Advanced Audio Coding) of ISO/IEC 13818-7.

FIG. 16 shows a configuration diagram of a conventional audio/video information recording/reproducing device using a phase-change optical disk. When recording video signals and audio signals, signals input from a video signal input portion 100 and an audio signal input portion 102 are compressed in a video compressing portion 101 and an audio compressing portion 103, respectively. Then, dummy packets generated by a dummy packet generating portion 105 for post-recording are mixed with the compressed results in a transport stream assembling portion 104 to produce transport streams. Then, the transport streams are written in a phase-change optical disk 131 via a buffer memory 154, a recording portion 120 and a pick-up 130.

When reproducing video signals and audio signals, the transport streams picked up by the pick-up 130 and passed through a reproducing portion 121 and the buffer memory 154 are separated into video signals and audio signals in a transport stream disassembling portion 115 and are output to a video display portion 110 and an audio output portion 112 via a video expanding portion 111 and a first audio expanding portion 113, respectively. A second audio expanding portion 114 is used to reproduce back audio (described later) when the back audio is recorded in the transport streams.

When recording video signals and audio signals, a recoding control portion 151 controls the recording portion 120, a continuous data area detecting portion 150 and a logical block managing portion 141 and performs recording. In this case, the continuous data area detecting portion 150 checks the use status of the sectors managed by the logical block managing portion 141 in response to an instruction of the recording control portion 151 and detects vacant areas that physically are continuous.

When reproducing video signals and audio signals, a reproducing control portion 140 controls a reproducing portion 121 and the recording portion 120 and performs reproduction. A recording control portion 152 for post recording and a reproducing control portion 153 for post-recording are started up at the time of post-recording, which will be described later.

It should be noted that "recording of video signals and audio signals" is referred to as "recording of motion picture signals" in the following. Similarly, "recording of video and audio" is referred to as "recording of motion pictures".

FIG. 17 shows a recording format for recording video in real-time in the phase-change optical disk 131. The phase-change optical disk 131 is constituted by 2 kbyte sectors, and 16 sectors constitute one logical block (32 kbytes). An error correction code is provided with every logical block for recording in the phase-change disk 131. Furthermore, logical blocks that physically are continuous at least for a specific time (e.g., 0.86 seconds as described later) in terms of the maximum recording/reproducing rate are taken as one continuous data area. In this area, video object units (hereinafter, referred to as "VOBU") having a reproduction time (display time) of 0.4 to 1 second and constituted by MPEG transport streams are recorded sequentially. One VOBU contains video and audio compressed data that entirely can be decoded without additional data in principle. In other words, video and audio compressed data are complete within one VOBU.

One VOBU is constituted by transport packets with 188 bytes each, which are in a subordinate level of the MPEG transport stream. The transport packet is constituted by the following three types of transports packets: a video transport packet (V_TSP) in which video compressed data are stored, an audio transport packet (A_TSP) in which audio compressed data are stored, and a dummy audio transport packet (D_TSP). One VOBU contains all of V_TSP, A_TSP and D_TSP in a corresponding time. The data size of one VOBU is varied in the range up to the maximum recording/reproducing rate, if the bit rate of video signals is variable. On the other hand, if the bit rate of video signals is fixed, the data size of the VOBU is substantially constant.

FIG. 18 is a diagram showing the detail of V_TSP, A_TSP and D_TSP. The V_TSP includes a transport packet header and video data, the A_TSP includes a transport packet header and audio data, and the D_TSP includes a transport packet header and dummy data for back audio. The difference between the V_TSP, the A_TSP, and the D_TSP is identified with the PID (packet ID) in the transport packet headers. For example, as shown in FIG. 18, the V_TSP, the A_TSP, and the D_TSP are identified by assigning PID="0x0020" to the V_TSP, PID="0x0021" to the A_TSP, and PID="0x0022" to the D_TSP.

The continuous data area detecting portion 150 of the audio/video information recording/reproducing device shown in FIG. 16 redetects the next continuous data area at the time when the remaining area of one continuous data area becomes small. Then, when one continuous data area is filled up, writing is performed in the next continuous data area.

FIG. 19 shows the state in which the contents recorded on an optical disk are managed by a UDF (Universal Disk Format) file system. In this example, one MPEG transport stream is recorded as a file "MOVIE. MPG" by one ON operation and one OFF operation with a recording start button. The name and the file entry position of the file are managed by a FID (File Identifier Descriptor). Furthermore, one file and three continuous data areas a, b and c constituting this file are managed with allocation descriptors in the file entry. The following explains how the continuous data area has come to be divided into three portions. The structure of each allocation descriptor is composed of an extent length and an extent position as shown in FIG. 20.

When the recording control portion 151 finds a defective logical block while recording data in the continuous data area a, the recording control portion 151 skips the defective logical block and continues writing from the head of the continuous data area b. When the recording control portion 151 is about to arrive in an area where a PC file is recorded while recording data in the continuous data area b, the recording control portion 151 continues writing from the head of the continuous data area c. As a result, the file "MOVIE. MPG" is constituted by the three continuous data areas a, b, and c.

FIG. 21 shows the outline of the operation at the time of reproduction of a file. For reproduction, the reproducing control portion 140 performs simultaneously an operation of reading data from the optical disk 131 to the buffer memory 154 and an operation of reproducing data by data transfer from the buffer memory 154 to the transport stream disassembling portion 115. In this case, the data reading rate Vr is set to be higher than the data reproducing rate Vo so as to prevent data to be reproduced from not being present in the buffer memory 154 (underflow). Therefore, when continuous data reading and continuous data reproduction are performed constantly, surplus data to be reproduced can be held in an amount corresponding to the difference in the rate between the data reproducing rate Vo and the data reading rate Vr. Reproduction can be performed continuously by using this surplus data that can be held as reproduction data when data reading is interrupted by the jumping of the pick-up 130.

More specifically, when the data reading rate Vr is 24 Mbps, the data reproducing rate Vo is 10 Mbps, and the maximum movement time of the pick-up 130 is 0.5 seconds, surplus reproduction data of 5 M bits are necessary during pick-up movement. In order to obtain such surplus reproduction data, continuous reading for 0.36 seconds is necessary. In other words, it is necessary to perform continuous reading for a period of time obtained by dividing 5 M bits by the difference between the data reading rate, which is 24 Mbps, and the data reproducing rate, which is 10 Mbps.

Here, reproduction data of 8.6 M bits, that is, reproduction data for 0.86 seconds in terms of a reproducing rate of 10 Mbps is read during continuous reading of 0.36 seconds. Therefore, ensuring a continuous data area for 0.86 seconds or more to record motion pictures at up to 10 Mbps makes it possible to guarantee continuous data reproduction.

The maximum movement time of the pick-up 130 refers to a period of time that is required for a disk to move between the innermost circumference and the outermost circumference. This period of time includes rotational latency.

Several defective logical blocks may be present in the middle of the continuous data area. In this case, however, it is necessary to increase the continuous data area to an area slightly larger than the area for 0.86 seconds in view of a reading time necessary for reading the defective logical blocks for reproduction.

One of the functions commonly provided in a consumer movie is post-recording. Post-recording is a function of dubbing audio corresponding to video that is recorded once (hereinafter, referred to as "front audio") to newly recorded audio (hereinafter, referred to as "back audio").

The post-recording generally is constituted by the following three steps. In the first step, video is recorded in a recording mode that allows post-recording (hereinafter, referred to as "post-recording mode recording"). In the second step, back audio is recorded in synchronization with the recorded video while watching the recorded video (hereinafter, referred to as "post-recording recording"). In the third step, the video and the back audio in the second step are reproduced in synchronization (hereinafter, referred to as "post-recording reproduction"). These steps attain dubbing.

In the first step, the recording control portion 152 for post-recording records a MPEG transport stream including V_TSP, A_TSP, and D_TSP. In the second step, the recording control portion 152 for post-recording replaces D_TSP by A_TSP for back audio and records the A_TSP for back audio in the optical disk 131. In the third step, the reproducing control portion 153 for post-recording controls such that A_TSP for front audio, A_TSP for back audio and V_TSP are delivered to the transport stream disassembling portion 115. Thus, dubbing is attained.

A file including video and audio to be recorded during post-recording recording is referred to as a "motion picture file" in the following.

When there is no need for post-recording, a motion picture file that does not include D_TSP and is constituted by A_TSP and V_TSP is recorded.

When the reproducing control portion 140 reproduces a motion picture file that is recorded in the post-recording mode, D_TSP is not delivered to the transport stream disassembling portion 115, and A_TSP and V_TSP are delivered.

When recording back audio while watching video during post-recording recording, it is necessary to perform a process for reproducing video and a process for re-recording video including back audio at the same time. More specifically, the reproducing control portion 153 for post-recording stores a stream to be reproduced on the buffer, replaces D_TSP in the stream by A_TSP for back audio, and writes it back on the disk. That is to say, it is necessary to perform simultaneously continuous reproduction at the rate at which the video is recorded and continuous recording at the same rate. In order to realize this concurrent recording/reproducing process, it is necessary to realize a high transfer rate and a high-speed seek time, which requires an expensive disk drive.

DISCLOSURE OF INVENTION

It is an object of the present invention to provide an audio/video information recording/reproducing device and method that can perform a post-recording function on an optical disk easily with an inexpensive disk drive having a comparatively low-speed seek time to solve the above problem.

In order to achieve the above-described object, a first audio/video information recording/reproducing device of the present invention includes a video recording portion for recording video information as a video file; a video reproducing portion for reproducing the video information; and an audio reproducing portion for reproducing an audio file in which audio information is recorded. The video recording portion records the video information as the video file while guaranteeing real-time continuous reproduction of the video information and real-time continuous reproduction of the audio information at the same time.

In order to achieve the above-described object, a second audio/video information recording/reproducing device of the present invention includes an audio recording portion that records audio information as an audio file; a video reproducing portion that reproduces a video file in which video information is recorded; and an audio reproducing portion that reproduces the audio file. The audio recording portion records the audio information as the audio file while guaranteeing real-time continuous reproduction of the video information and real-time continuous reproduction of the audio information at the same time.

In order to achieve the above-described object, a third audio/video information recording/reproducing device of the present invention includes an audio recording portion that records audio information as an audio file; a video reproducing portion that reproduces video information recorded as a video file in real-time and continuously; and a recording portion for post-recording that reproduces the video information and records the audio information as the audio file at the same time, the audio information being input continuously.

In the third audio/video information recording/reproducing device, it is preferable that the video file is recorded while real-time continuous reproduction of the video information and reproduction of the audio information are guaranteed to be performed at the same time, and the audio file is recorded while real-time continuous reproduction of the video information and reproduction of the audio information are guaranteed at the same time.

In order to achieve the above-described object, a fourth audio/video information recording/reproducing device of the present invention includes a video reproducing portion that reproduces in real-time and continuously a video file in which video information is recorded; an audio reproducing portion that reproduces in real-time and continuously an audio file in which audio information is recorded; and a reproducing portion for post-recording that reproduces the video information and reproduces the audio information at the same time. The video file is recorded while real-time continuous reproduction of the video information and the audio information is guaranteed at the same time. The audio file is recorded while real-time continuous reproduction of the video information and the audio information is guaranteed at the same time. The reproducing portion for post-recording performs real-time continuous reproduction of the video information by the video reproducing portion and real-time continuous reproduction of the audio information by the audio reproducing portion at the same time.

In order to achieve the above-described object, a fifth audio/video information recording/reproducing device of the present invention includes a video reproducing portion that reproduces video information in real-time and continuously; an audio reproducing portion that reproduces audio information in real-time and continuously; and a reproducing portion for post-recording that reproduces video information and reproduces the audio information at the same time. The video information is recorded while real-time continuous reproduction of the video information and the audio information is guaranteed at the same time. The audio information is recorded while real-time continuous reproduction of the video information and the audio information is guaranteed at the same time. The reproducing portion for post-recording performs real-time continuous reproduction of the video information by the video reproducing portion and real-time continuous reproduction of the audio information by the audio reproducing portion at the same time.

In the fourth and fifth audio/video information recording/reproducing devices, it is preferable that in reading the video file and the audio file and reproducing the video file and the audio file as the video information and the audio information, respectively, the reproducing portion for post-recording reads the audio file when the data amount of the audio information that has been read and is to be reproduced reaches a predetermined value or less, and the reproducing portion for post-recording reads the video file when the data amount exceeds the predetermined value.

In the first to fifth audio/video information recording/reproducing devices, it is preferable that the audio file and the video file are recorded in different recording media.

In the first to fifth audio/video information recording/reproducing devices, it is preferable that the audio file is constituted by a group of continuous data areas for audio having a fixed length and composed of a plurality of physically continuous recording units in which the audio information can be recorded, and the video file is constituted by a group of continuous data areas for video composed of a plurality of physically continuous recording units in which video information can be reproduced at a maximum reading rate for at least a time required for obtaining surplus video information in an amount corresponding to a total period of a period three times the maximum movement time of a reading/writing head and a period for reading one of the continuous data areas for audio.

In the first to fifth audio/video information recording/reproducing devices, it is preferable that the audio file is constituted by a group of continuous data areas for audio having a predetermined data size or more and composed of a plurality of physically continuous recording units in which the audio information can be recorded, and the video file is constituted by a group of continuous data areas for video composed of a plurality of physically continuous recording units in which video information can be reproduced at a maximum reading rate for at least a time required for obtaining surplus video information in an amount corresponding to a total period of a period four times the maximum movement time of a reading/writing head and a period for reading the predetermined data size of the continuous data areas for audio.

In the first to fifth audio/video information recording/reproducing devices, it is preferable that the audio file is non-compressed audio data.

In order to achieve the above-described object, a sixth audio/video information recording/reproducing device of the present invention includes a video recording portion that records video information as a video file; an audio recording portion that records audio information as an audio file; a video reproducing portion that reproduces in real-time and continuously the video file recorded on a recording medium as the video information; a recording portion for post-recording that reproduces the video information and records the audio information associated with the video information as the audio file at the same time; and a synthesis recording portion that records synthesized information obtained by synthesizing the video information and the audio information as a synthesized video file. The video recording portion records video information. The recording portion for post-recording performs real-time continuous reproduction of the video information by the video reproducing portion and recording of the audio information associated with the video information by the audio recording portion at the same time. The synthesis recording portion records the synthesized file.

In order to achieve the above-described object, a seventh audio/video information recording/reproducing device of the present invention includes a video recording portion that records video information as a video file; an audio recording portion that records audio information as an audio file; a synthesis recording portion that records synthesized information obtained by synthesizing the video information and the audio information as a synthesized video file; and a reproducing portion for post-recording that reproduces the synthesized file recorded on a recording medium as the synthesized information in real-time and continuously. The video recording portion records video information. The audio recording portion records the audio information associated with the video information. The synthesis recording portion creates and records the synthesized file. The reproducing portion for post-recording reproduces in real-time and continuously the video information and the audio information at the same time by reproducing the synthesized file.

In the first to seventh audio/video information recording/reproducing devices, it is preferable that the audio data of the audio file has the same data structure as that of the video data of the video file.

In order to achieve the above-described object, an eighth audio/video information recording/reproducing device of the present invention includes a video recording portion that records video information in a continuous data area for video; an audio recording portion that records audio information in a group of continuous data areas for audio having a predetermined data size; a video reproducing portion that reproduces the recorded video information in a designated order; an audio reproducing portion that reproduces the recorded audio information; and a reproducing portion for post-recording that reproduces the video information and the audio information at the same time. The video reproducing portion continues to display one piece of the video information at least for a total period of at least a period twice the maximum movement time of a reading/writing head, a period for reading one of the continuous data areas for audio, and a period for reading one of the continuous data areas for video.

In order to achieve the above-described object, a first method for recording/reproducing audio/video information of the present invention is characterized in that while real-time continuous reproduction of video information recorded as a video file and real-time continuous reproduction of audio information recorded as an audio file are guaranteed at the same time, the video information is recorded as the video file.

In order to achieve the above-described object, a second method for recording/reproducing audio/video information of the present invention is characterized in that while real-time continuous reproduction of video information recorded as a video file and real-time continuous reproduction of audio information recorded as an audio file are guaranteed at the same time, the audio information is recorded as the audio file.

In order to achieve the above-described object, a third method for recording/reproducing audio/video information of the present invention is characterized in that video information recorded as a video file is reproduced in real-time and continuously, and audio information that is input continuously is recorded as an audio file at the same time.

In the third method for recording/reproducing audio/video information, it is preferable that the video file is recorded while real-time continuous reproduction of the video information and reproduction of the audio information are guaranteed to be performed at the same time, and the audio file is recorded while real-time continuous reproduction of the video information and reproduction of the audio information are guaranteed at the same time.

In order to achieve the above-described object, a fourth method for recording/reproducing audio/video information of the present invention is characterized in that a video file is recorded while real-time continuous reproduction of video information recorded as a video file and audio information recorded as an audio file is guaranteed at the same time, an audio file is recorded while real-time continuous reproduction of the video information and the audio information is guaranteed at the same time, and real-time continuous reproduction of the video information and real-time continuous reproduction of the audio information are performed at the same time.

In the fourth method for recording/reproducing audio/video information, it is preferable that in reading the video file and the audio file and reproducing the video information and the audio information, respectively, the audio file is read when the data amount of the audio information that has been read and is to be reproduced reaches a predetermined value or less, and the video file is read when the data amount exceeds the predetermined value.

In the first to fourth method for recording/reproducing audio/video information, it is preferable that the audio file and the video file are recorded in different recording media.

In the first to fourth method for recording/reproducing audio/video information, it is preferable that the audio file is constituted by a group of continuous data areas for audio having a fixed length composed of a plurality of physically continuous recording units in which the audio information can be recorded, and the video file is constituted by a group of continuous data areas for video composed of a plurality of physically continuous recording units in which video information can be reproduced at a maximum reading rate for at least a time required for obtaining surplus video information in an amount corresponding to a total period of a period three times the maximum movement time of a reading/writing head and a period for reading one of the continuous data areas for audio.

In the first to fourth method for recording/reproducing audio/video information, it is preferable that the audio data of the audio file has the same data structure as that of the video data of the video file.

In order to achieve the above-described object, a fifth method for recording/reproducing audio/video information of the present invention is characterized in that video information is recorded as a video file, the video information is reproduced in real-time and continuously, and audio information associated with the video information is recorded as an audio file at the same time, and synthesized information obtained by synthesizing the video information and the audio information is recorded as a synthesized video file.

In order to achieve the above-described object, a sixth method for recording/reproducing audio/video information of the present invention is characterized in that video information recorded in a continuous data area for video is reproduced in a designated order, and audio information recorded in a group of continuous data areas for audio having a predetermined data size is reproduced at the same time, and one piece of the video information is displayed continuously at least for a total period of at least a period twice the maximum movement time of a reading/writing head, a period for reading one of the continuous data areas for audio, and a period for reading one of the continuous data areas for video.

In order to achieve the above-described object, a ninth audio/video information recording/reproducing device of the present invention includes a video recording portion that records video information as a video file; a video reproducing portion that reproduces the video information; an audio recording portion that records audio information as an audio file; and an audio reproducing portion that reproduces the audio information. The video recording portion records the video information as the video file, while real-time continuous reproduction of the video information and real-time continuous recording of the audio information are guaranteed at the same time, and real-time continuous reproduction of the video information and real-time continuous reproduction of the audio information are guaranteed at the same time.

In order to achieve the above-described object, a tenth audio/video information recording/reproducing device of the present invention includes an audio recording portion that records audio information as an audio file; an audio reproducing portion that reproduces the audio file in real-time and continuously; a video reproducing portion that reproduces video information recorded as a video file in real-time and continuously; a recording portion for post-recording that reproduces the video information and records the audio information that is input continuously at the same time. The video file is recorded, while real-time continuous reproduction of the video information and reproduction of the audio information are guaranteed to be performed at the same time, and real-time continuous reproduction of the video information and real-time continuous recording of the audio information are guaranteed to be performed at the same time.

In order to achieve the above-described object, an eleventh audio/video information recording/reproducing device of the present invention includes a video reproducing portion that reproduces in real-time and continuously a video file in which video information is recorded; an audio recording portion that records audio information as an audio file; an audio reproducing portion that reproduces the audio file in real-time and continuously; a reproducing portion for post-recording that reproduces the video information and reproduces the audio information at the same time. The video file is recorded, while real-time continuous reproduction of the video information and real-time continuous recording of the audio information are guaranteed at the same time, and real-time continuous reproduction of the video information and real-time continuous reproduction of the audio information are guaranteed at the same time. The audio file is recorded, while real-time continuous reproduction of the video information and real-time continuous reproduction of the audio information are guaranteed at the same time. The reproducing portion for post-recording performs the real-time continuous reproduction of the video information by the video reproducing portion and the real-time continuous reproduction of the audio information by the audio reproducing portion at the same time.

In order to achieve the above-described object, a twelfth audio/video information recording/reproducing device of the present invention includes a video recording portion that records video information in a continuous data area for video; an audio recording portion that records audio information in a group of continuous data areas for audio having a predetermined data size; a video reproducing portion that reproduces the recorded video information in a designated order; and a recording portion for post-recording that reproduces the video information in the designated order and records the audio information at the same time. The video reproducing portion continues to display one piece of the video information at least for a total period of at least a period twice the maximum movement time of a reading/writing head, a period for reading one of the continuous data areas for audio, and a period for writing in one of the continuous data areas for video.

In order to achieve the above-described object, a seventh method for recording/reproducing audio/video information of the present invention is characterized in that video information recorded in a continuous data area for video is reproduced in a designated order, and audio information is recorded in a group of continuous data areas for audio having a predetermined data size at the same time, and one piece of the video information is displayed continuously at least for a total period of at least a period twice the maximum movement time of a reading/writing head, a period for reading one of the continuous data areas for audio, and a period for writing in one of the continuous data areas for video.

With the above configuration, real-time reproduction of video files can be guaranteed, so that video information and audio information can be reproduced without interruption, and also in reproduction of audio information for post-recording, data can be reproduced in real-time continuously without no data missing.

BEST MODE FOR CARRYING OUT THE INVENTION

Hereinafter, embodiments of the present invention will be described with reference to the accompanying drawings.

Embodiment 1

Figure 1:
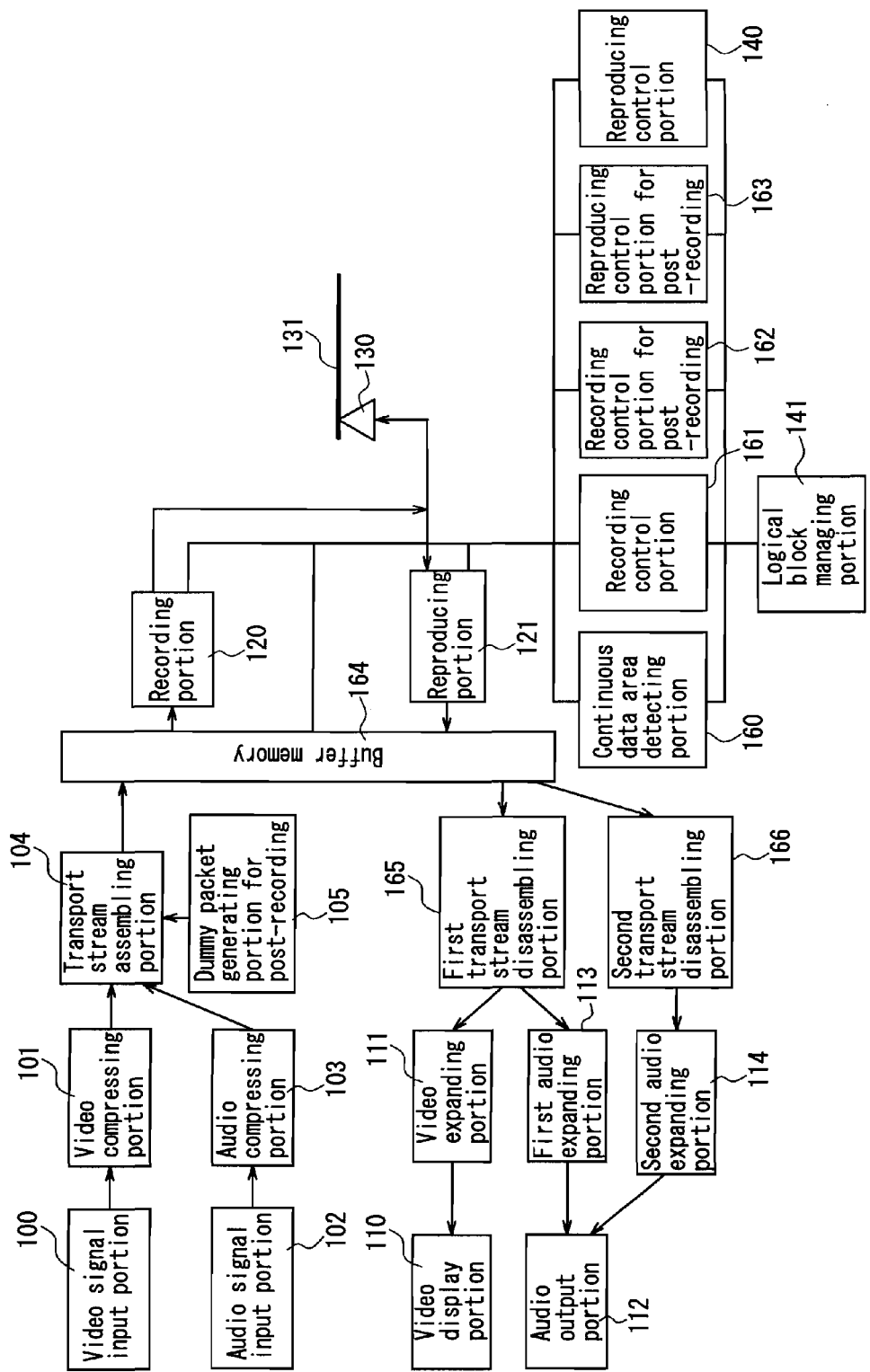
FIG. 1 is a block diagram showing a functional configuration of an audio/video information recording/reproducing device according to Embodiment 1 of the present invention.
Figure 16:
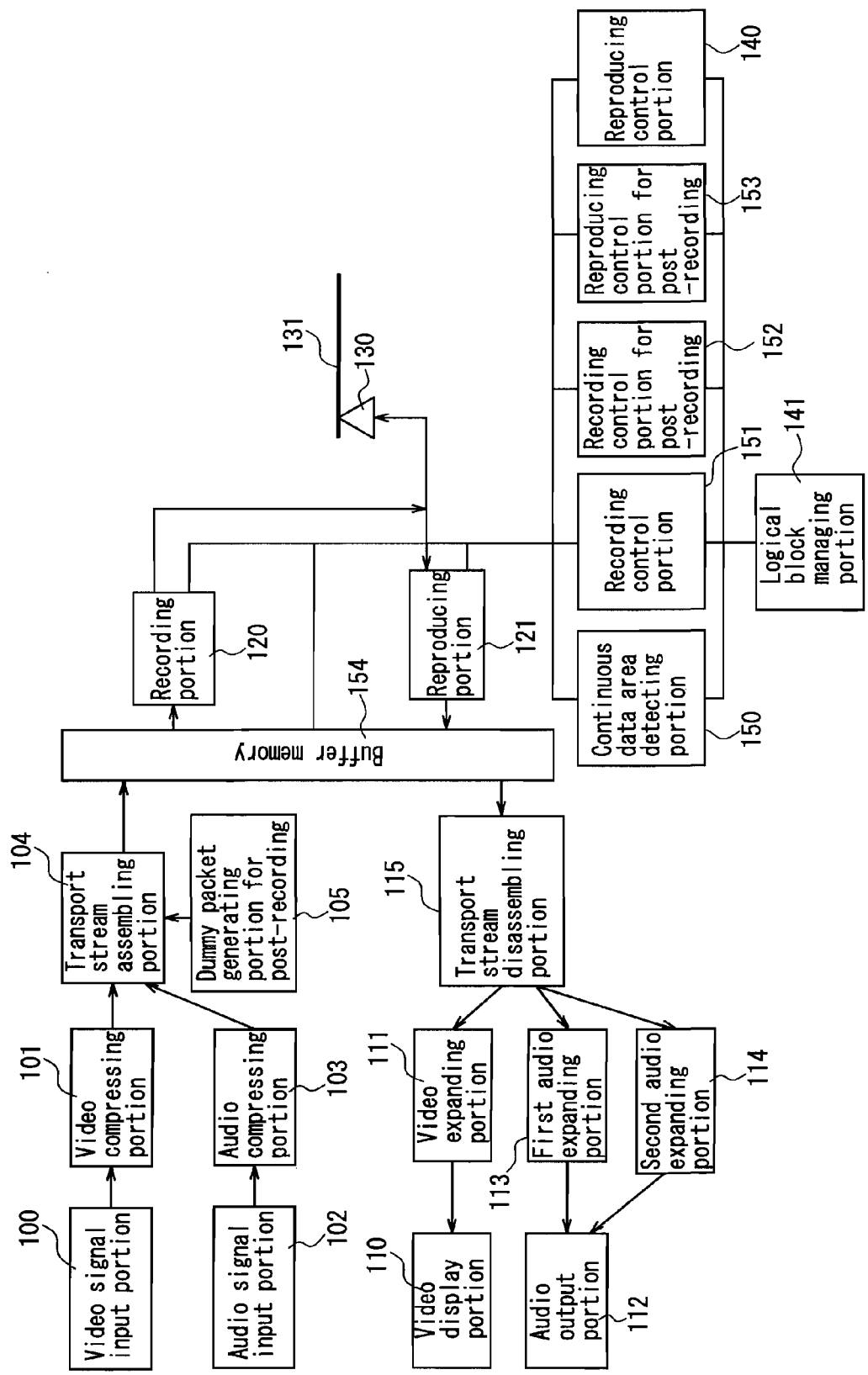
FIG. 16 is a block diagram showing a functional configuration of a conventional audio/video information recording/reproducing device.

FIG. 1 is a block diagram showing the configuration of an audio/video information recording/reproducing device according to Embodiment 1 of the present invention. This embodiment is different from the conventional example (FIG. 16) in that this embodiment has a second transport stream disassembling portion 166, and the functions of the continuous data area detecting portion 160, the recording control portion 161, the recording control portion 162 for post-recording, the reproducing control portion 163 for post-recording, and the buffer memory 164 are different. The data reading rate of the reproducing portion 121, the maximum reproduction rate of motion picture data input to a first transport stream disassembling portion 165, and the maximum movement time at the time of the reading operation and the writing operation of the pick-up 130 are the same as those of the conventional example.

Figure 2:
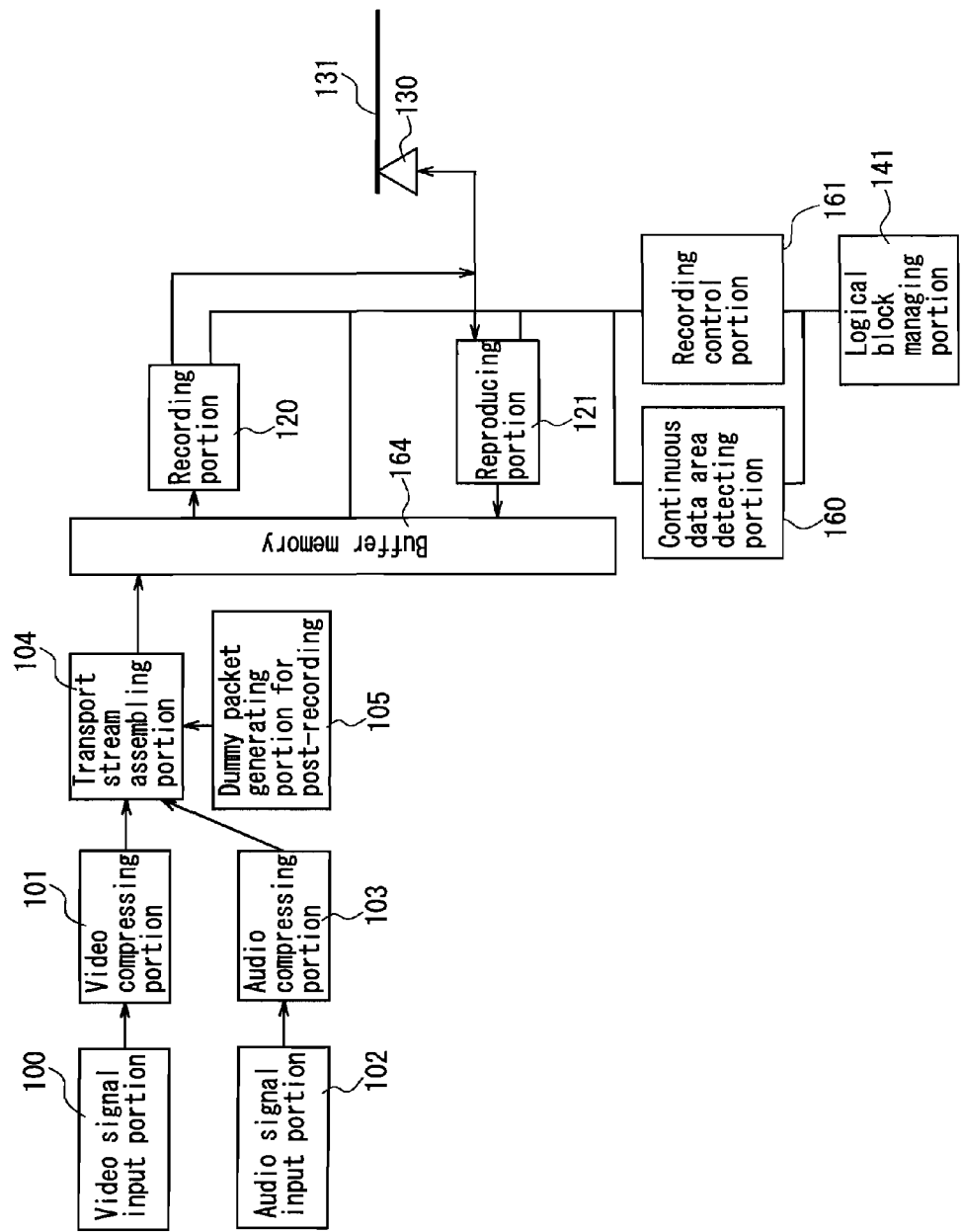
FIG. 2 is a block diagram relevant to post-recording mode recording in an audio/video information recording/reproducing device according to Embodiment 1 of the present invention.
Figure 3:
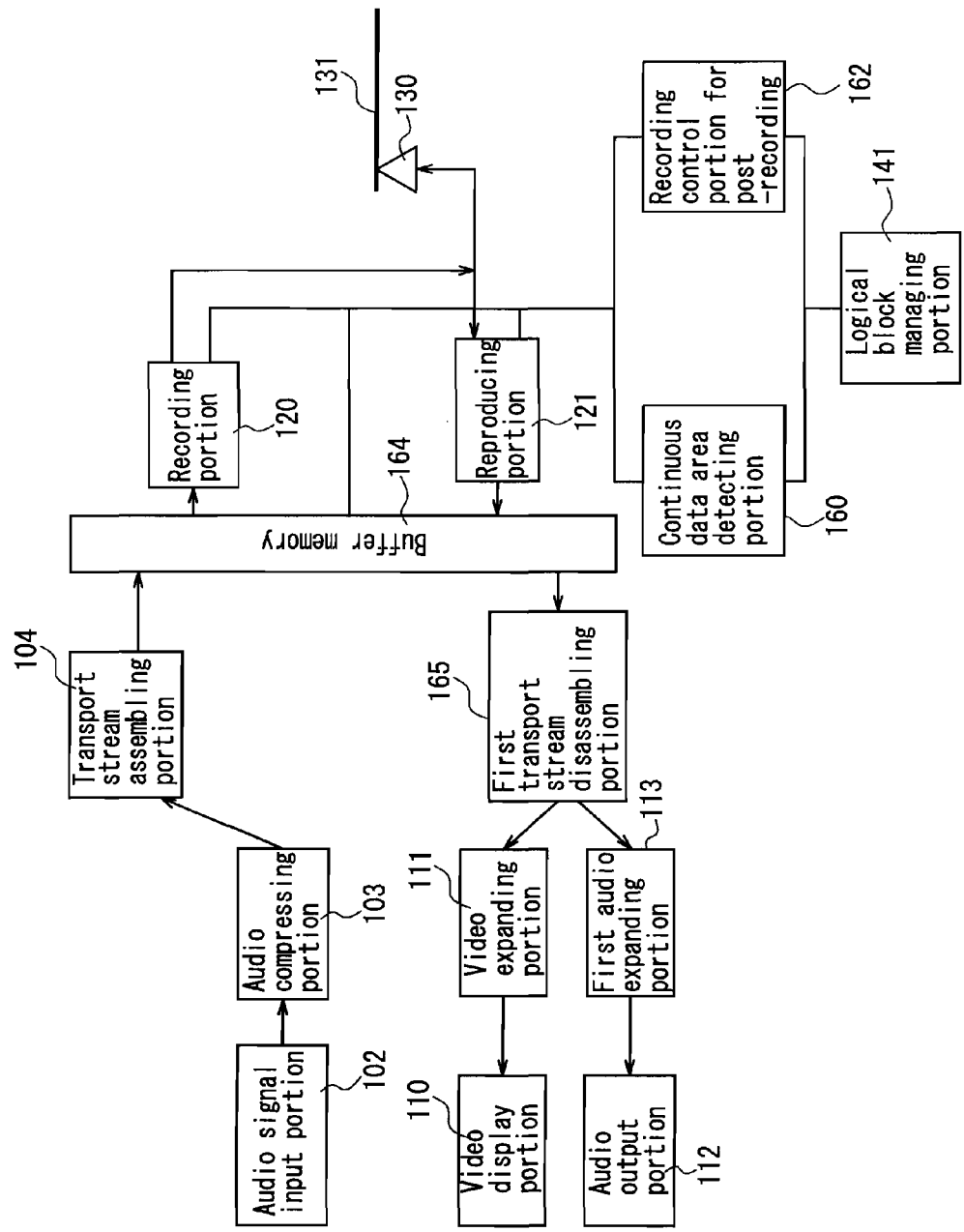
FIG. 3 is a block diagram relevant to post-recording recording in an audio/video information recording/reproducing device according to Embodiment 1 of the present invention.
Figure 4:
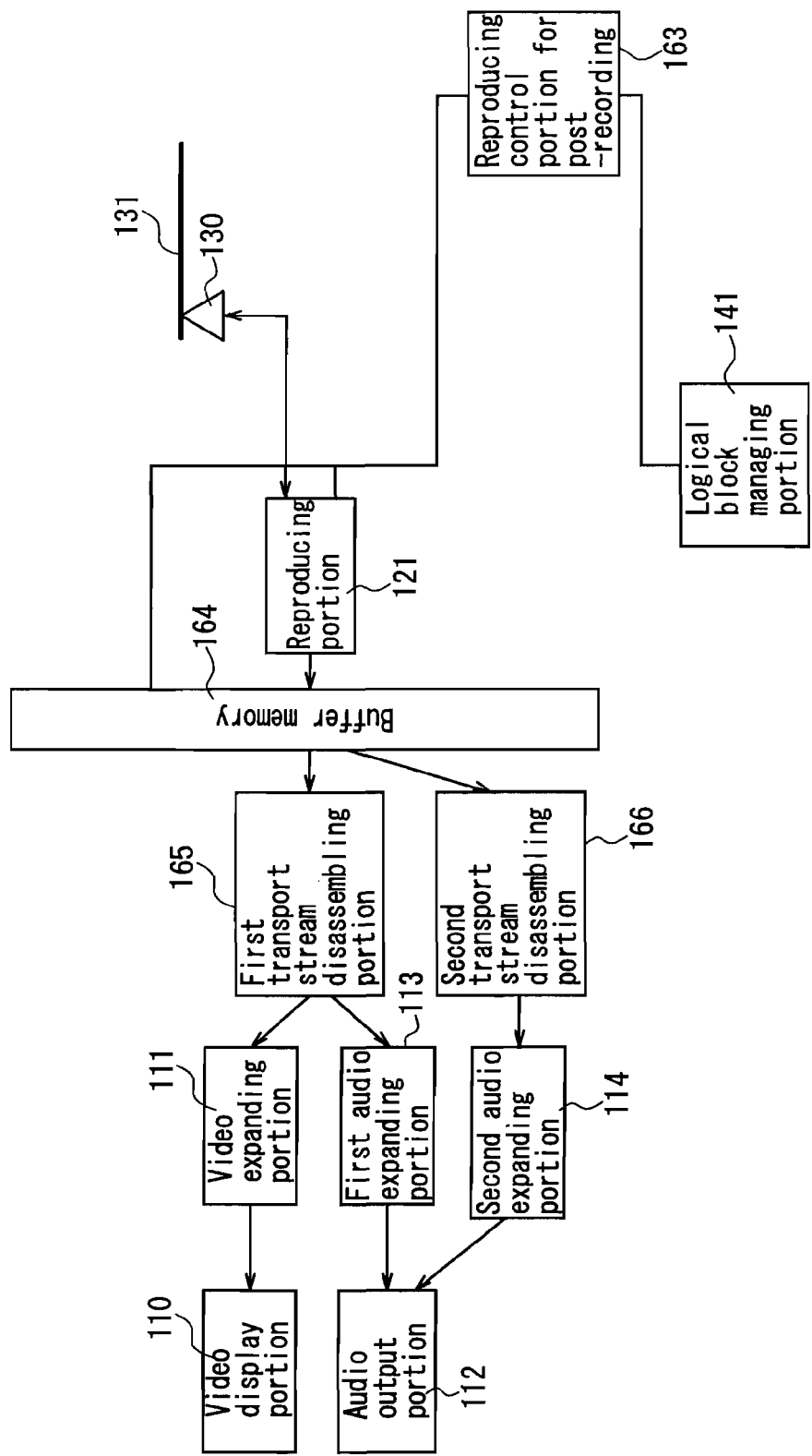
FIG. 4 is a block diagram relevant to post-recording reproduction in an audio/video information recording/reproducing device according to Embodiment 1 of the present invention.

FIG. 2 shows a block relevant to post-recording mode recording in the functional block of FIG. 1. FIG. 3 shows a block relevant to post-recording recording in the functional block of FIG. 1. FIG. 4 shows a block relevant to post-recording reproduction in the functional block of FIG. 1.

Figure 5:
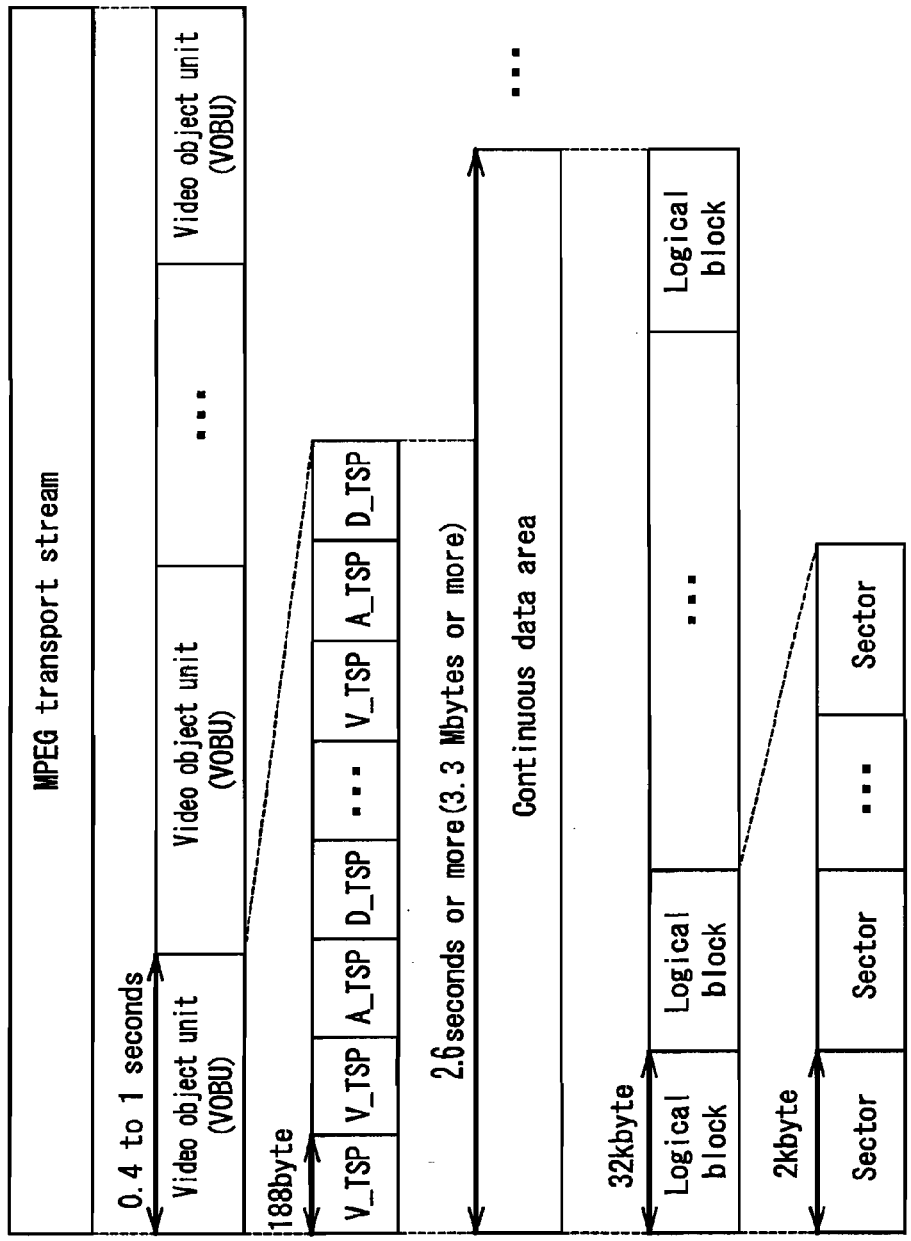
FIG. 5 is a diagram showing the recording form of a motion picture file at the time of post-recording mode recording in an audio/video information recording/reproducing device according to Embodiment 1 of the present invention.
Figure 17:
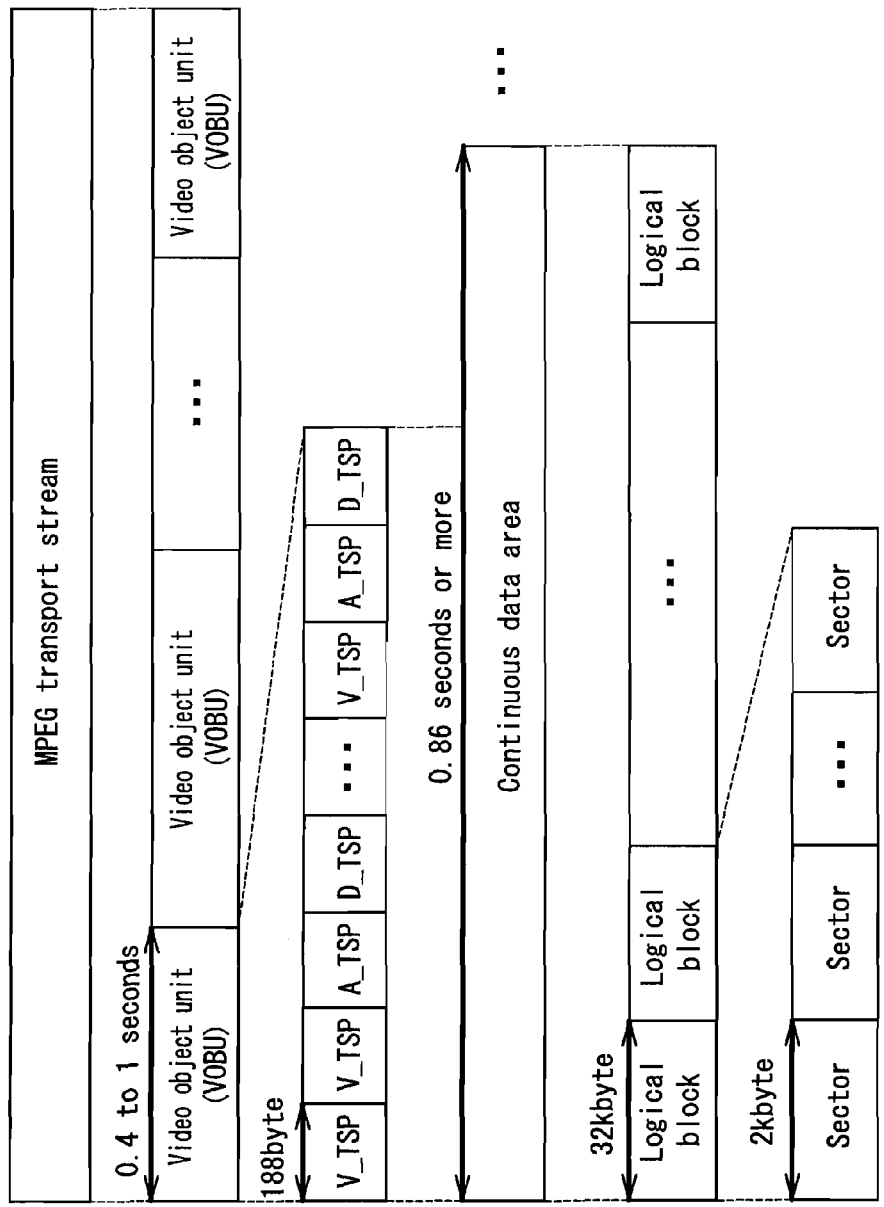
FIG. 17 is a diagram showing the recording form of a motion picture file at the time of post-recording mode recording in the conventional audio/video information recording/reproducing device.
Figure 18:
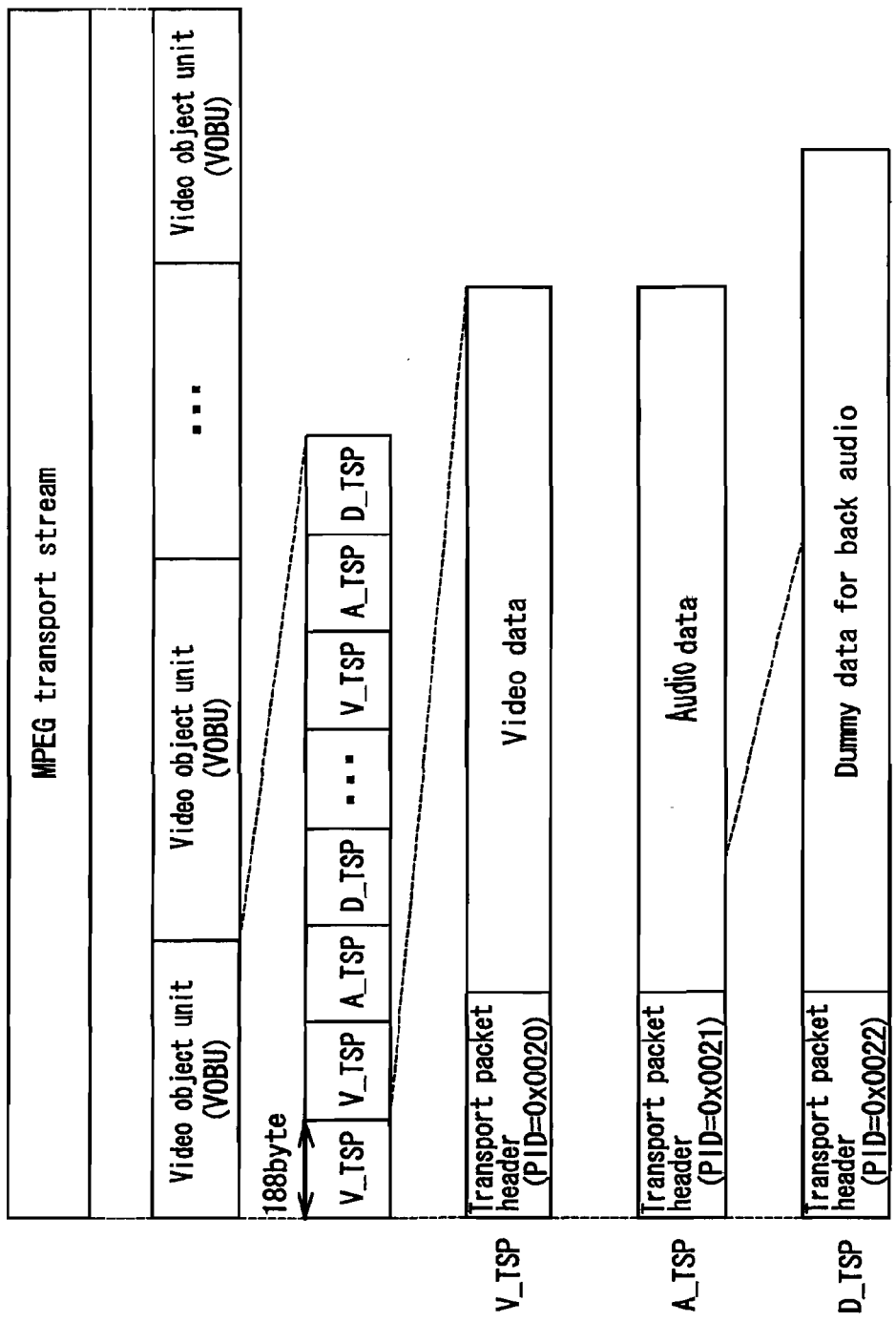
FIG. 18 is a diagram showing the configuration of a transport stream of a motion picture file at the time of post-recording mode recording in the conventional audio/video information recording/reproducing device.
Figure 19:
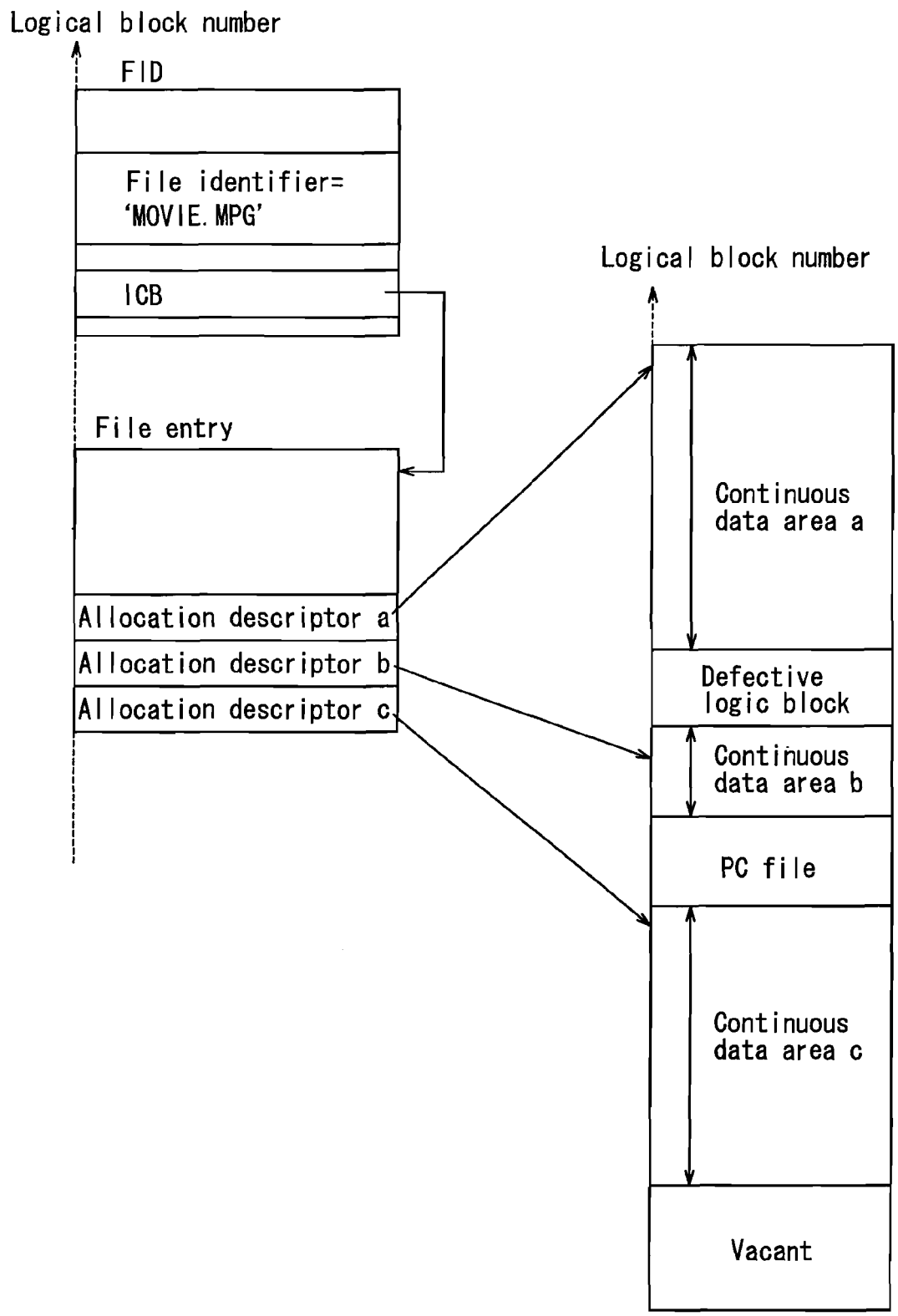
FIG. 19 is a diagram showing the state in which the motion picture file is managed by a UDF file system.
Figure 20:
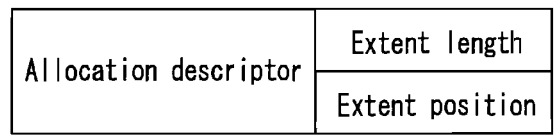
FIG. 20 is a diagram showing a data structure of the allocation descriptor of the UDF file system.
Figure 21:
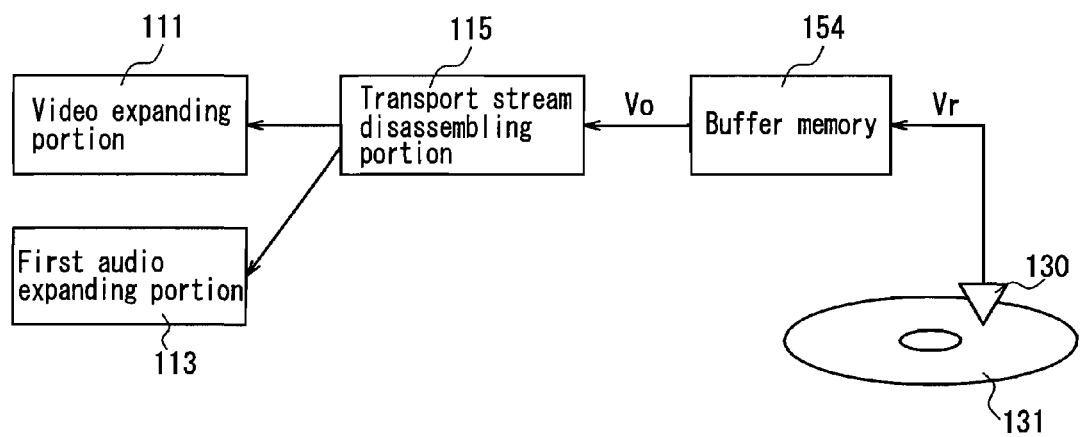
FIG. 21 is a diagram showing an operation model at the time of reproducing a file in the conventional audio/video information recording/reproducing device.
Figure 22:
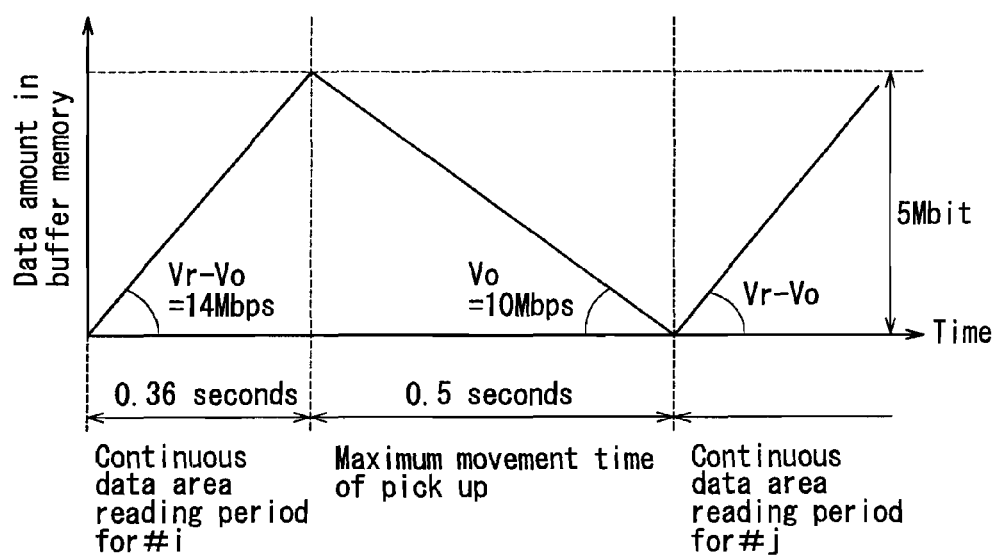
FIG. 22 is a diagram showing the transition of the code amount in a motion picture buffer memory and an audio buffer memory at the time of post-recording reproduction in the conventional audio/video information recording/reproducing device.

FIG. 5 is a diagram showing the recording form of video and audio in the audio/video information recording/reproducing device according to Embodiment 1 of the present invention. This is different from FIG. 17 showing a conventional example only in the length of the continuous data area (different by the length corresponding to 2.6 seconds or more). Other aspects (e.g., VOBU is constituted by V_TSP, A_TSP and D_TSP) are the same.

Figure 6:
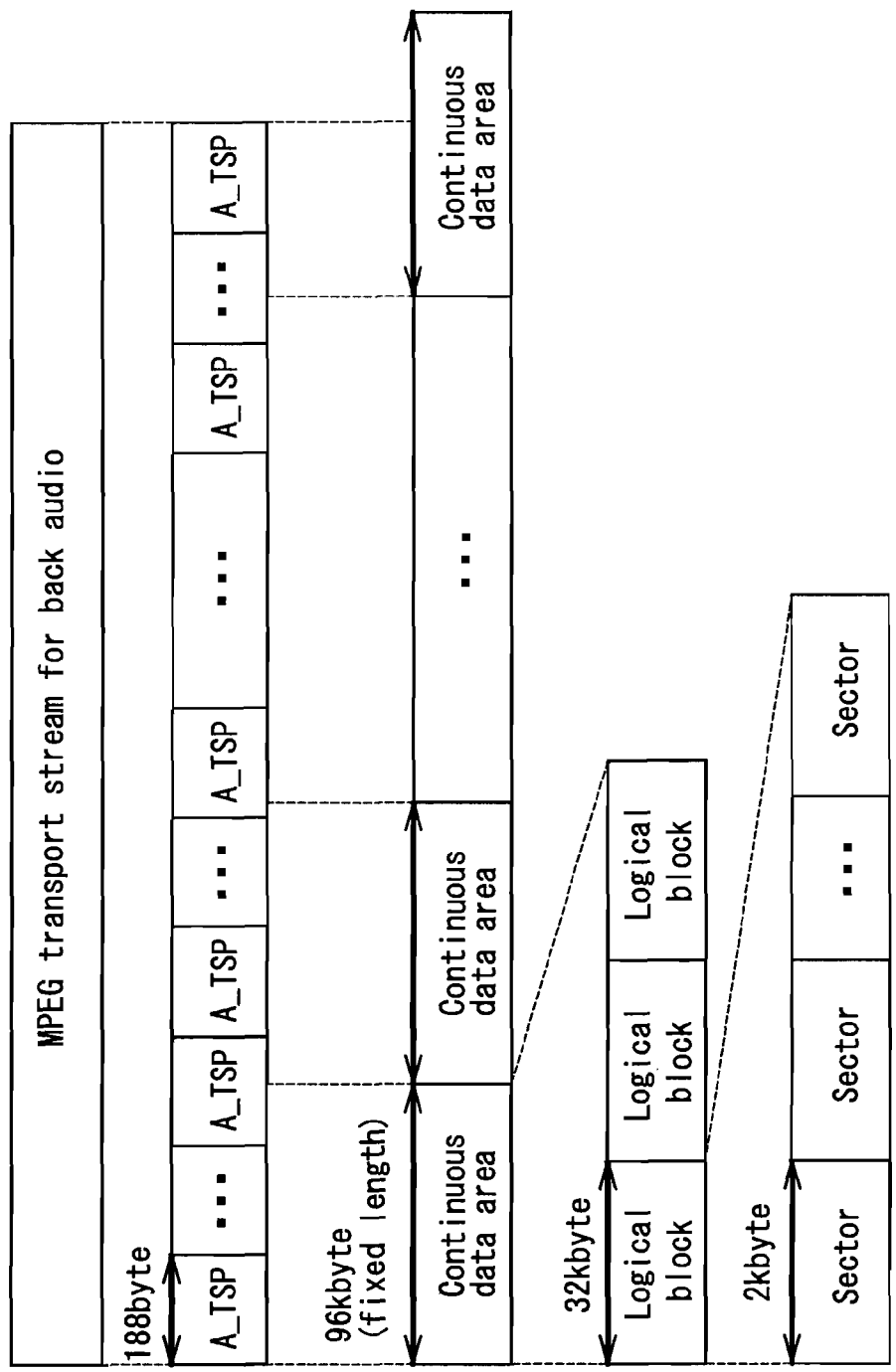
FIG. 6 is a diagram showing the recording form of a back audio file at the time of post-recording recording in an audio/video information recording/reproducing device according to Embodiment 1 of the present invention.

FIG. 6 is a diagram showing the recording form of a back audio file to be recorded at the time of post-recording recording in Embodiment 1 of the present invention. The back audio file is constituted by A_TSP obtained by encoding back audio. More specifically, a transport stream is constituted by adding a transport packet header to audio data that have been compressed and encoded based on AAC (Advanced Audio Coding). This transport stream is recorded continuously in a plurality of continuous data areas, each having a fixed length of 96 kbytes, held on the optical disk 131. Each 96 kbyte area may be physically apart. Although omitted in FIG. 6, PAT, PMT and the like are essential packets to the transport stream, and contained in the back audio file.

Figure 7:
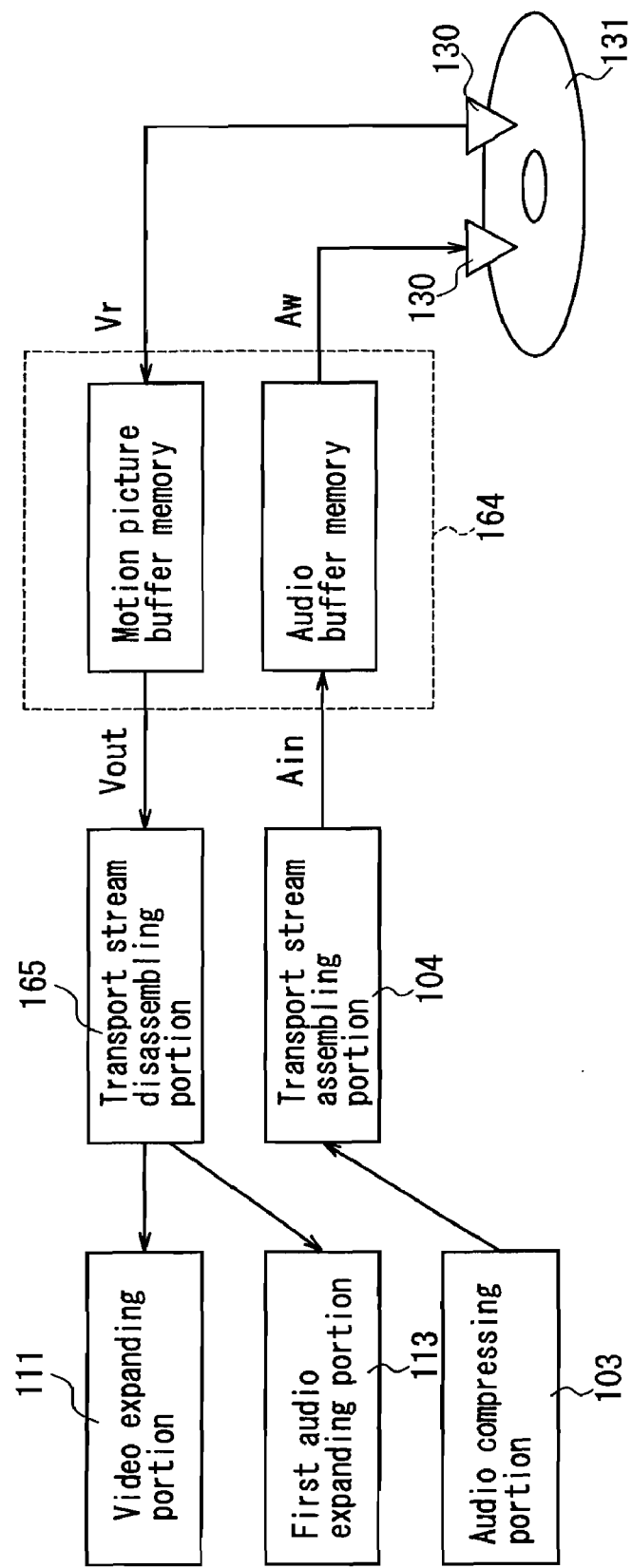
FIG. 7 is a diagram showing an operation model at the time of post-recording recording in an audio/video information recording/reproducing device according to Embodiment 1 of the present invention.

FIG. 7 is a diagram showing an operation model at the time of post-recording recording in Embodiment 1 of the present invention. The motion picture data recorded on the optical disk 131 are taken in a motion picture buffer memory at a rate Vr via the pick-up 130. These motion picture data are transferred to the transport stream disassembling portion 165 at a rate Vout, and then are reproduced by the video expanding portion 111 and the first audio expanding portion 113 into video and audio. On the other hand, audio signals are converted into audio data by the audio compressing portion 103, and then are taken in the audio buffer memory at a rate Ain via the transport stream assembling portion 104. Furthermore, these audio data are written in the optical disk 131 at a rate $A_w$ via the pick-up 130. The reading of the motion picture data and the writing of the audio data are achieved by switching one pick-up 130 alternately in a time-division manner. In this embodiment, it is assumed that Vr>Vout and Aw>Ain are satisfied.

Figure 8:
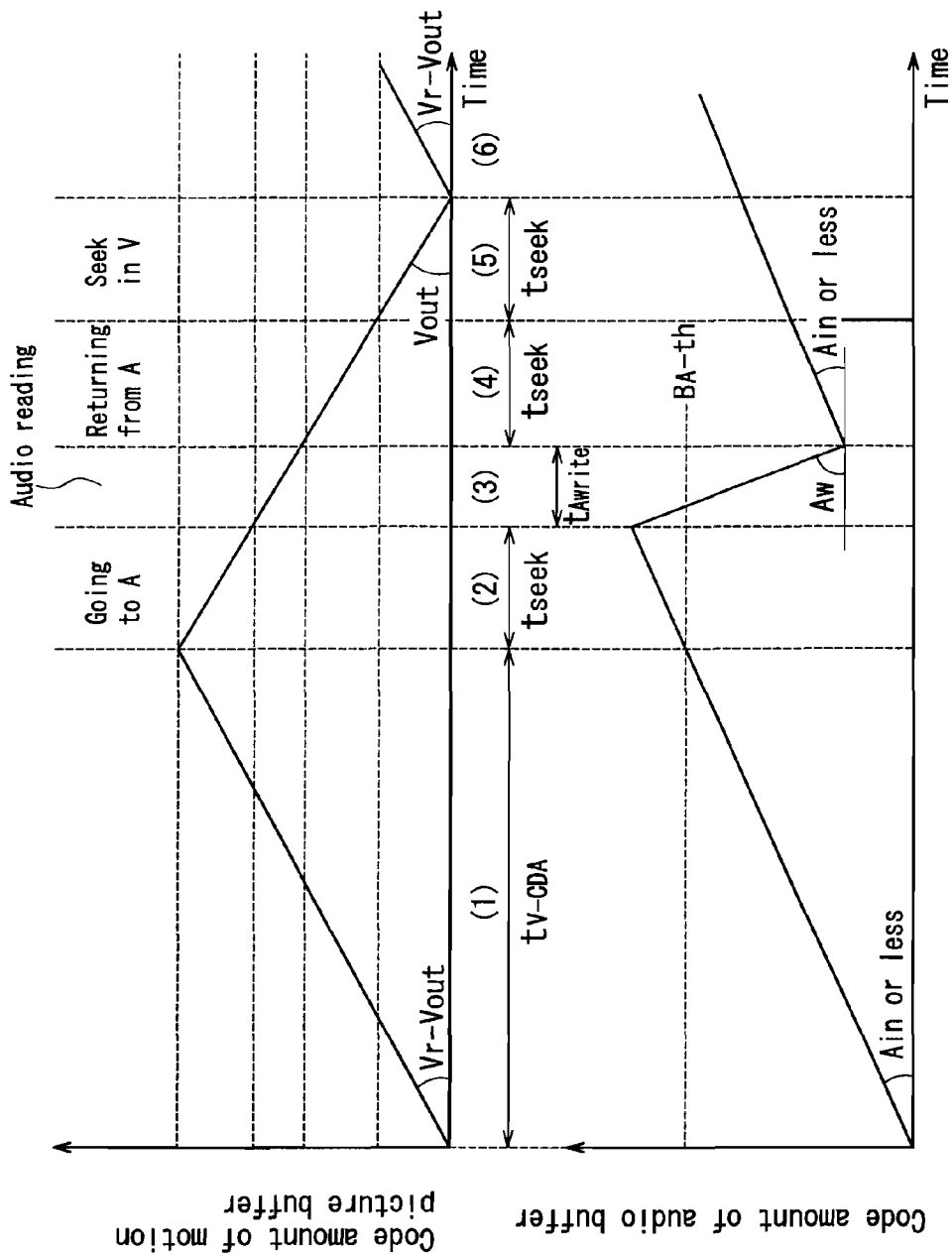
FIG. 8 is a diagram showing the transition of the code amount in a motion picture buffer memory and an audio buffer memory at the time of post-recording recording in an audio/video information recording/reproducing device according to Embodiment 1 of the present invention.

FIG. 8 is a diagram showing the transition of the code amount in the motion picture buffer memory and the audio buffer memory at the time of post-recording recording in Embodiment 1 of the present invention. In FIG. 8, $t_{seek}$ refers to the maximum movement time of the pick-up 130, $t_{Awrite}$ refers to the writing time of an audio file for back audio, and $t_{V-CDA}$ refers to the reading time of the continuous data area for motion pictures. $B_{A-th}$ is the threshold at which a seek operation for writing of audio data starts. When the code amount in the audio buffer memory reaches $B_{A-th}$ or more, the pick-up 130 starts to move from areas for the motion picture data to areas for the back audio data. In Embodiment 1, it is assumed that $B_{A-th}$ is 96 kbytes.

Figure 9:
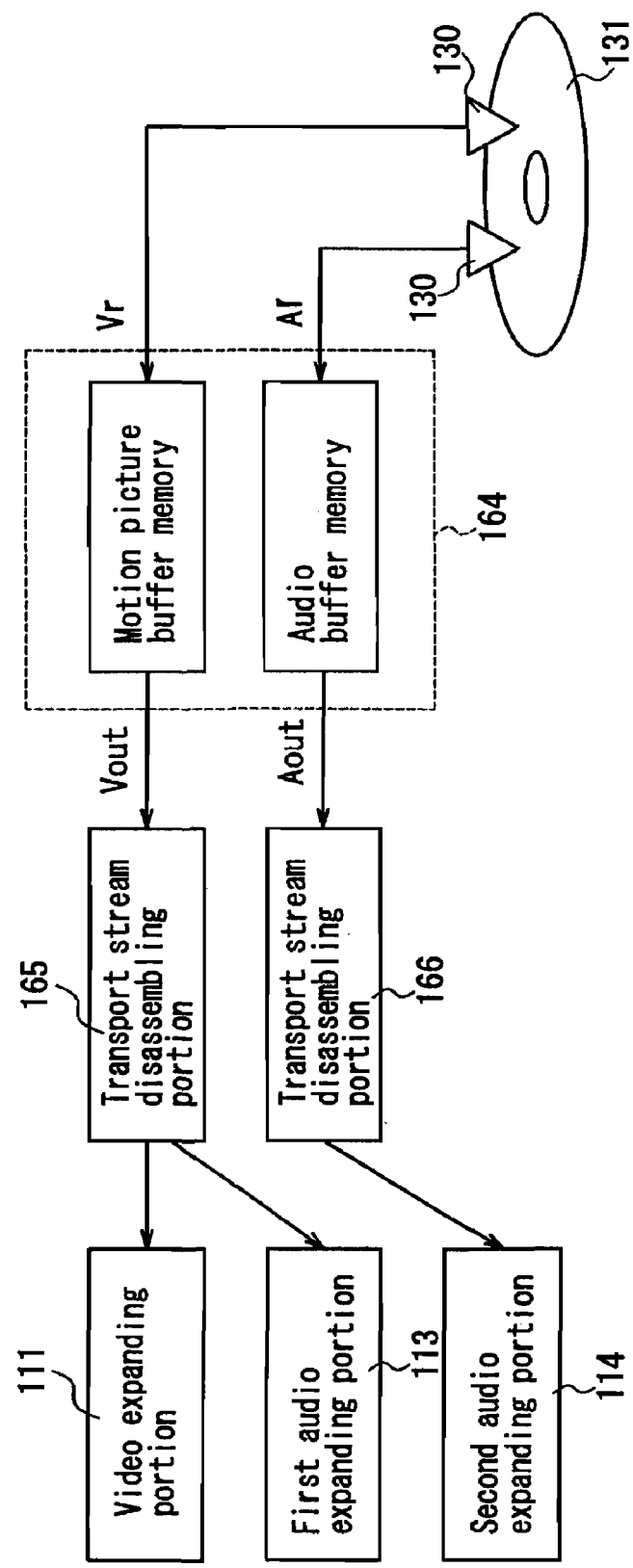
FIG. 9 is a diagram showing an operation model at the time of post-recording reproduction in an audio/video information recording/reproducing device according to Embodiment 1 of the present invention.

FIG. 9 is a diagram showing an operation model at the time of post-recording reproduction in of Embodiment 1 of the present invention. The motion picture data recorded on the optical disk 131 are taken in a motion picture buffer memory at a rate Vr via the pick-up 130. These motion picture data are transferred to the transport stream disassembling portion 165 at a rate Vout, and then are reproduced by the video expanding portion 111 and the first audio expanding portion 113 into video and audio. On the other hand, the back audio data recorded on the optical disk 131 are taken in an audio buffer memory at a rate Ar via the pick-up 130, and these back audio data are reproduced as back audio at a rate Aout by the second audio expanding portion 114 via the transport stream disassembling portion 166. In this embodiment, it is assumed that Vr>Vout and Ar>Aout are satisfied.

Figure 10:
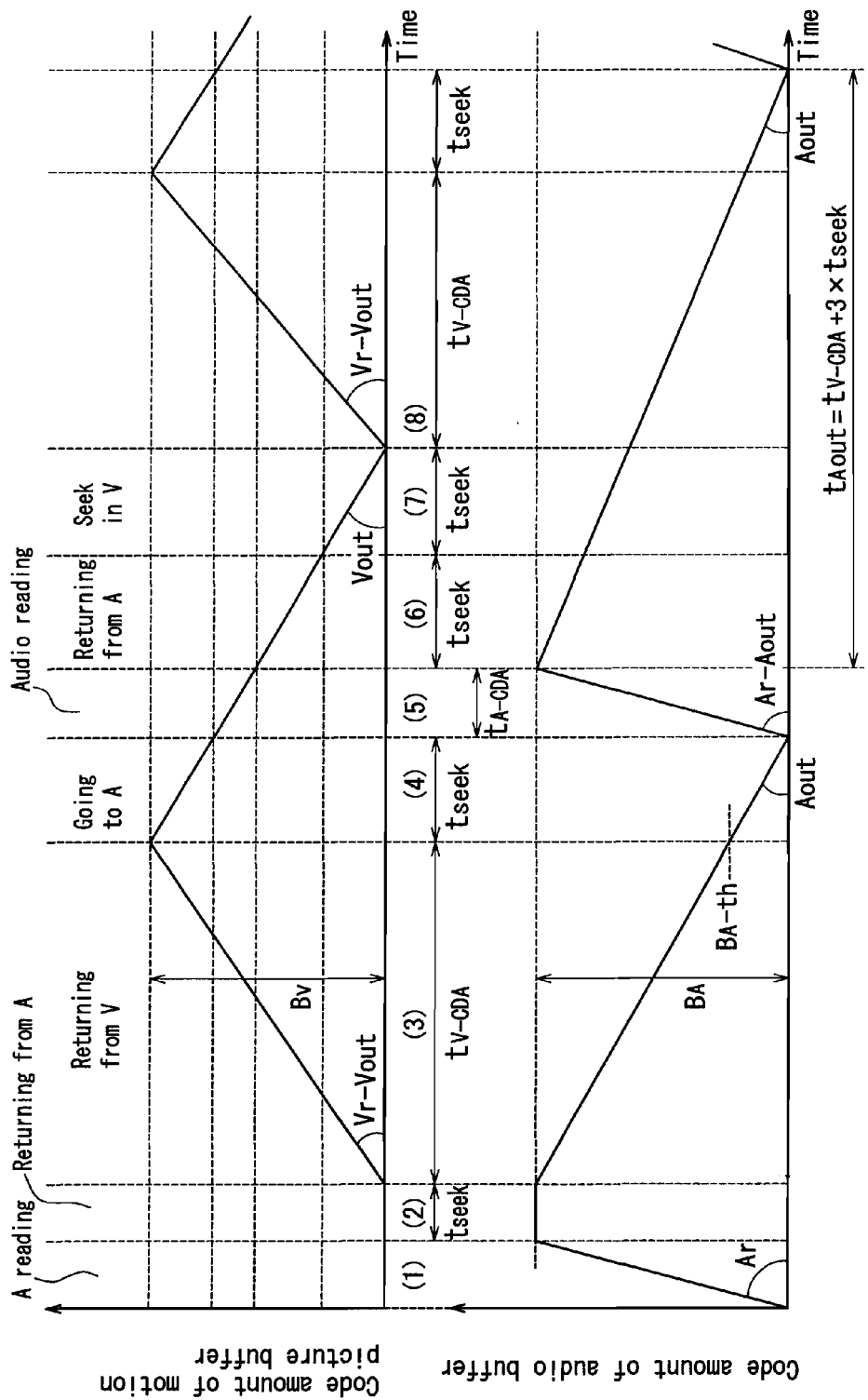
FIG. 10 is a diagram showing the transition of the code amount in a motion picture buffer memory and an audio buffer memory at the time of post-recording reproduction in an audio/video information recording/reproducing device according to Embodiment 1 of the present invention.

FIG. 10 is a diagram showing the transition of the code amount in the motion picture buffer memory and the audio buffer memory at the time of post-recording reproduction in Embodiment 1 of the present invention. $B_V$ refers to the motion picture buffer memory size, and $B_A$ refers to the audio buffer memory size.

The functional block of FIG. 2 is utilized for post-recording mode recording. The recording control portion 161 controls the recording portion 120, the continuous data area detecting portion 160 and the logical block managing portion 141 and thus performs port-recording mode recording. In this case, the recording control portion 161 causes the continuous data area detecting portion 160 to detect vacant areas that physically are continuous.

More specifically, a recording-start operation allows the transport stream assembling portion 104 to divide compressed video signals and compressed audio signals into 188 byte transport packets V_TSP and A_TSP, respectively. Furthermore, D_TSP, which is generated by the dummy packet generating portion 105 for post-recording, is added thereto to create a transport stream by aligning these three transport packets sequentially so as to constitute one VOBU. Then, the transport stream is delivered to the recording portion 120 via the buffer memory 164.

The recording portion 120 starts to record the VOBU from the position with the logical block number indicated by the recording control portion 161. In this case, one VOBU is divided into 32 kbyte units, and an error correction code is added to each 32 kbyte unit for recording on one logical block in the optical disk. When the recording of one VOBU is completed in the middle of one logical block, the next VOBU is recorded continuously without any gap.

The continuous data area detecting portion 160 searches the use status of the logical block managed by the logical block managing portion 141 so as to detect an unused logical block area that is continuous in an amount corresponding to 2.6 seconds in terms of the maximum recording/reproducing rate. In addition, the continuous data area detecting portion 160 notifies the recording portion 120 of the logical block number of that logical block area at every occasion of writing of a logical block unit, and notifies the logical block managing portion 141 of the fact that the logical block will be used.

The logical block managing portion 141 activates the reproducing portion 121, if necessary, and reads space bit maps of the UDF file system recorded on the optical disk 131 and thus keeps track of the use status of the logical block. In this embodiment, the space bit maps are read collectively at the time of turning the power on, so that it is not necessary to read the space bit maps in the course of post-recording mode recording, post-recording recording, and post-recording reproduction.

Next, for post-recording recording (recording back audio), the function block shown in FIG. 3 in the function block of FIG. 1 is utilized. The recording control portion 162 for post-recording performs control such that the MPEG transport stream recorded on the optical disk 131 passes through the pick-up 130, the reproducing portion 121, and the transport stream disassembling portion 165 so as to reproduce video and audio. In this case, the buffer memory 164 is divided into the motion picture buffer memory and the audio buffer memory as shown in FIG. 7, and the buffer memory 164 is used for temporary storage of previously recorded data for motion pictures and audio. At the same time, the recording control portion 162 for post-recording compresses the audio of the audio signal input portion 102 into AAC compression codes by passing them through the audio compressing portion 103, and further converts them into the MPEG transport stream by passing them through the transport stream assembling portion 104.

The converted MPEG transport stream is recorded as a back audio file on the phase-change optical disk 131 via the buffer memory 164 (the audio buffer memory), the recording portion 120, and the pick-up 130.

As shown in FIG. 6, the back audio files are arranged in physically continuous areas having a fixed length (which is different from the motion picture file in that this has a fixed length and in the data size). A plurality of such continuous data areas are held and the transport stream for back audio is arranged continuously in these areas. The areas having a fixed length may be physically apart from each other.

The recording control portion 162 for post-recording reproduces video via the pick-up 130 during a time period (1) of FIG. 8, so that video data are stored at least at a rate Vr-Vout or more in the motion picture buffer memory. On the other hand, the transport stream for back audio is stored at a rate Ain or less in the audio buffer memory. When the amount of the data stored in the audio buffer memory exceeds 96 kbytes, which is the data size of the continuous data area for audio, the recording control portion 162 for post-recording causes the pick-up 130 to move to a vacant continuous data area for back audio data for writing of the back audio data (a time period (2)). During this movement, the reading of motion pictures from the disk is interrupted, so that the data amount in the motion picture buffer memory decreases at a rate of up to Vout. When the movement of the pick-up 130 ends, as shown during a time period (3), the code amount of the audio buffer memory is decreased at a rate Aw by the writing of the back audio data. When writing the back audio data for one continuous data area is completed, the pick-up 130 is returned to the position at which the reading of the motion picture file is interrupted (a time period (4)). When, immediately after it returns to that position, the pick-up 130 encounters a discontinuous portion in the continuous data area of the motion picture file, which is the worst case, the pick-up 130 is moved to the next continuous data area, and therefore the motion picture data in the motion picture buffer memory is decreased to 0 (a time period (5)). Then, when the reading of the motion picture data in the next continuous data area starts again, the motion picture data are stored in the motion picture buffer memory at least at a rate Vr-Vout (a time period (6)). After this process, post-recording recording is performed while moving the pick-up 130 alternately in the manner as described above.

As described above, the minimum size of the continuous data area of the motion picture file is such a size that allows motion picture data sufficient for display of motion pictures continuously during the total time of a time for three pick-up movements and a time for writing audio data to be stored in the motion picture buffer memory without fail. Therefore, the motion pictures can be reproduced in real-time continuously without interruption. Furthermore, also the audio file also can be written continuously with no data missing.

For post-recording reproduction, the function block of FIG. 4 is utilized. The reproducing control portion 163 for post-recording reproduces the motion picture file recorded on the optical disk 131 into video and front audio by passing it through the pick-up 130, the reproducing portion 121, the first transport stream disassembling portion 165, the video expanding portion 111 and the first audio expanding portion 113. At the same time, the reproducing control portion 163 for post-recording reproduces the back audio file recorded on the optical disk 131 as back audio by passing it through the pick-up 130, the reproducing portion 121, the second transport stream disassembling portion 166, and the second audio expanding portion 114. In this case, the buffer memory 164 is divided into the motion picture buffer memory and the audio buffer memory as shown in FIG. 9, and the motion picture buffer memory is used to store data of the motion picture file, and the audio buffer memory is used to store data of the back audio file.

During a time period (1) shown in FIG. 10, the reproducing control portion 163 for post-recording reads the back audio file in an amount corresponding to one continuous data area for audio (96 kbytes). Thus, the back audio data are stored in the audio buffer memory. Then, the pick-up 130 starts to move from areas for the back audio file to areas for the motion picture file (a time period (2)). When the pick-up 130 arrives at areas for the motion picture file, reading and reproducing the motion picture data start from the head of a time period (3). Therefore, data are stored in the motion picture buffer memory at least at a rate Vr-Vout. At the same time, from the head of the time period (3), reproduction of data in the audio buffer memory is started. Thus, the data amount in the audio buffer memory decreases at a rate of up to Aout. At the time when this data amount reaches $B_{A-th}$, the pick-up 130 on areas for the motion picture file is started to move onto areas for the audio file (a time period (4)). This movement interrupts the reading of the motion picture data from the optical disk 131, so that the code amount in the motion picture buffer memory decreases at a rate of up to Vout. When this movement is completed, data reading from the back audio file is started during a time period (5). Therefore, the audio data are stored in the audio buffer memory at least at a rate Ar-Aout. During a time period (6), the reproducing control portion 163 for post-recording causes the pick-up 130 to move from areas for the back audio file to areas for the motion picture file. FIG. 10 shows an example where after the movement is completed, the pick-up 130 happens to encounter a discontinuous point (the boundary of continuous data areas) of the motion picture file during a time period (7), and movement of the pick-up 130 occurs. When this movement is completed, the reading of motion picture data is started again during a time period (8). After this process, post-recording reproduction is performed while moving the pick-up 130 alternately in the manner as described above.

In FIG. 10, there are the following relationships, when $t_{V-CDA}$ is a time length for the minimum reading of the continuous data area for motion pictures at the time of the post-recording reproduction, and $t_{A-CDA}$ is a time length for reading of the continuous data area for audio at the time of the post-recording reproduction.

$$(Vr-Vout)t_{V-CDA}=V_{out}\times(3t_{seek}+t_{A-CDA}) \quad \text{Equation 1}$$

$$(Ar-Aout)t_{A-CDA}=Aout\times t_{Aout} \quad \text{Equation 2}$$

$$t_{Aout}=t_{V-CDA}+3t_{seek} \quad \text{Equation 3}$$

Therefore, $t_{V-CDA}$ and $t_{A-CDA}$ can be obtained as follows.

$$t_{V-CDA}=(Vout/Vr)\times(3t_{seek}+t_{A-CDA})/(1-(Vout/Vr)) \quad \text{Equation 4}$$

$$t_{A-CDA}=((Aout/Ar)\times 3t_{seek})/(1-(Aout/Ar)-(Vout/Vr)) \quad \text{Equation 5}$$

The minimum data size $S_{V-CDA}$ of the continuous data area for video and the minimum data size $S_{A-CDA}$ of the continuous data area for audio can be obtained as follows.

$$S_{v-CDA}=Vr\times t_{V-CDA} \quad \text{Equation 6}$$

$$S_{A-CDA}=Ar\times t_{A-CDA} \quad \text{Equation 7}$$

In the case of this embodiment, calculation is performed with $t_{seek}$=0.5 s, Vout=10 Mbps, Vr=24 Mbps, Aout=288 kbps, and Ar=24 Mbps, which results in $t_{v-CDA}$=1.1 S, $S_{v-CDA}$=3.3 Mbytes, $t_{A-CDA}$=0.03 s, and $S_{A-CDA}$=90 kbytes. Here, $S_{A-CDA}$ is set to 96 kbytes so that this is a multiple of the byte of the logical block.

As described above, the continuous data area of the motion picture file has a size (3.3 Mbytes) that makes it possible to store reliably, in the motion picture buffer memory, motion picture data sufficient to display motion pictures continuously during the total period (1.53 seconds) of a period three times the movement time of the pick-up 130 and a period for reading audio data. Therefore, the video and the front audio can be reproduced in real-time continuously without interruption. At the same time, the back audio file also can be reproduced in real-time continuously with no data missing.

Furthermore, there is an advantage in that video and a plurality of back audio can be compared by creating a plurality of back audio files for one video, and selecting appropriately a combination of a video file and a back audio file.

The data size of the continuous data area for a back audio file is assumed to be a fixed length, but it may be a variable length having a size of that fixed value or more. However, in this case, it is necessary to extend the minimum data size of the continuous data area for the motion picture file by the length allowing for the maximum time for one movement of the pick-up 130. In other words, the data size of the continuous data area for the motion picture file may have a length allowing for a time for four movements of the pick-up 130 and a time for reading the audio data.

Figure 24:
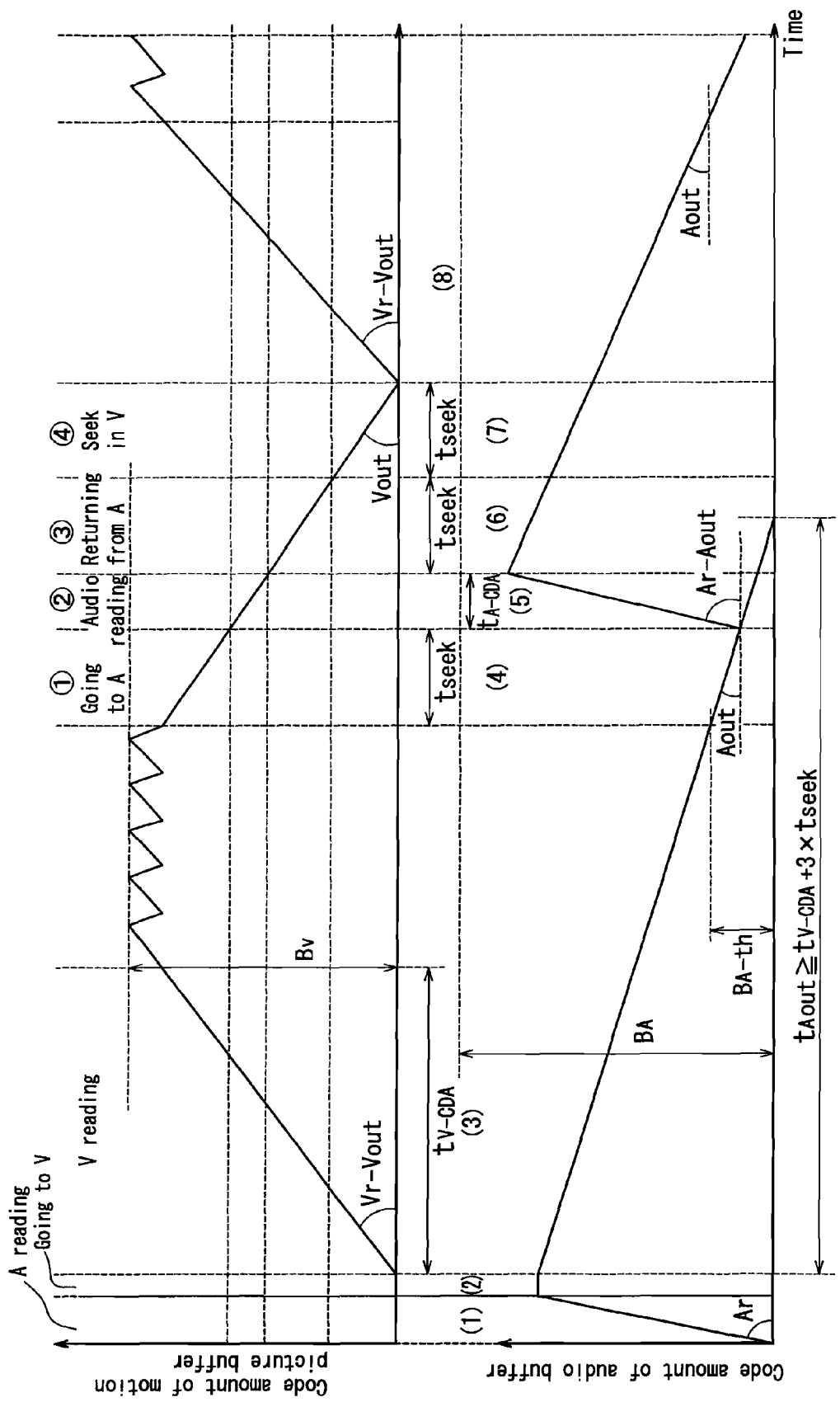
FIG. 24 is a diagram showing the transition of the code amount in a motion picture buffer memory and an audio buffer memory at the time of post-recording reproduction in the audio/video information recording/reproducing device according to Embodiment 1 of the present invention when the continuous data area for motion pictures is held slightly longer.

FIG. 10 shows an example where the motion picture file and the back audio file are read exactly in synchronization. However, the reading does not have to be synchronized exactly. In general, if a relatively long continuous data area is held for the motion picture file, the operation is such as shown in FIG. 24. This operation is different from that in FIG. 10 in that a time period (3) is larger in this operation, because the continuous data area for the back audio file is larger. In this case, Equation 3 can be replaced by Equation 8 below.

$$t_{Aout}\geq t_{V-CDA}+3t_{seek} \quad \text{Equation 8}$$

Embodiment 2

Next, Embodiment 2 of the present invention will be described. Embodiment 2 is different from Embodiment 1 in the encoding method for back audio. In Embodiment 1, the AAC compression codes are used, whereas linear PCM or pulse code modulation codes are used in Embodiment 2.

Figure 11:
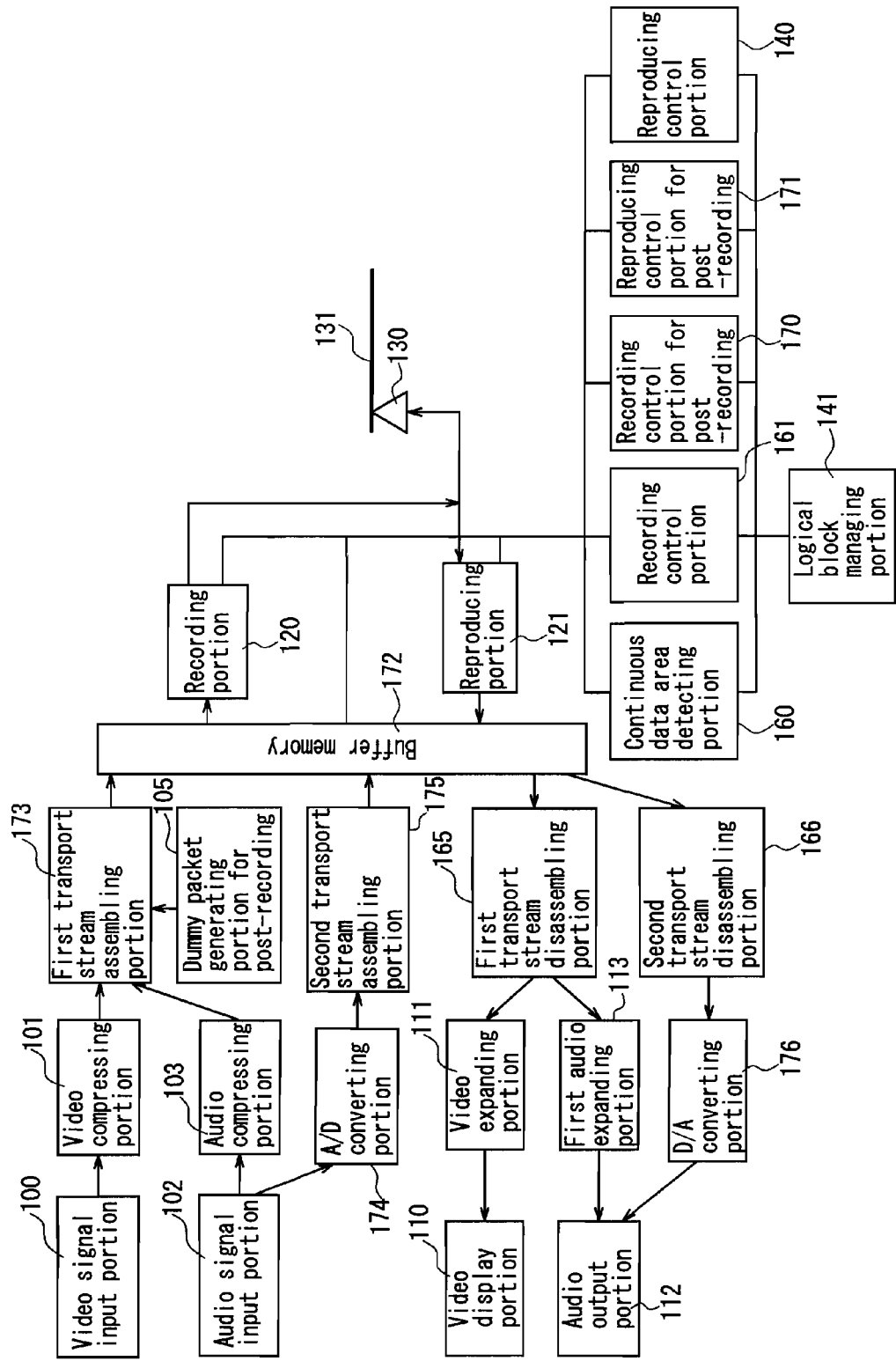
FIG. 11 is a block diagram showing a functional configuration of an audio/video information recording/reproducing device according to Embodiment 2 of the present invention.

FIG. 11 is a block diagram showing a functional configuration of an audio/video information recording/reproducing device according to Embodiment 2 of the present invention. FIG. 11 is different from FIG. 1 in that an A/D converting portion 174 and a second transport stream assembling portion 175 are included, the transport stream assembling portion 104 is replaced by a first transport stream assembling portion 173 (having the same function), the second audio expanding portion 114 is replaced by a D/A converting portion 176, and a recording control portion 170 for post-recording, a reproducing control portion 171 for post-recording and a buffer memory 172 that have different functions are included. The data reading rate of the reproducing portion 121, the maximum recording/reproducing rate of the transport stream disassembling portions 165 and 166, and the maximum movement time of the pick-up 130 during reading operation and writing operation are the same as those of the conventional example.

Figure 12:
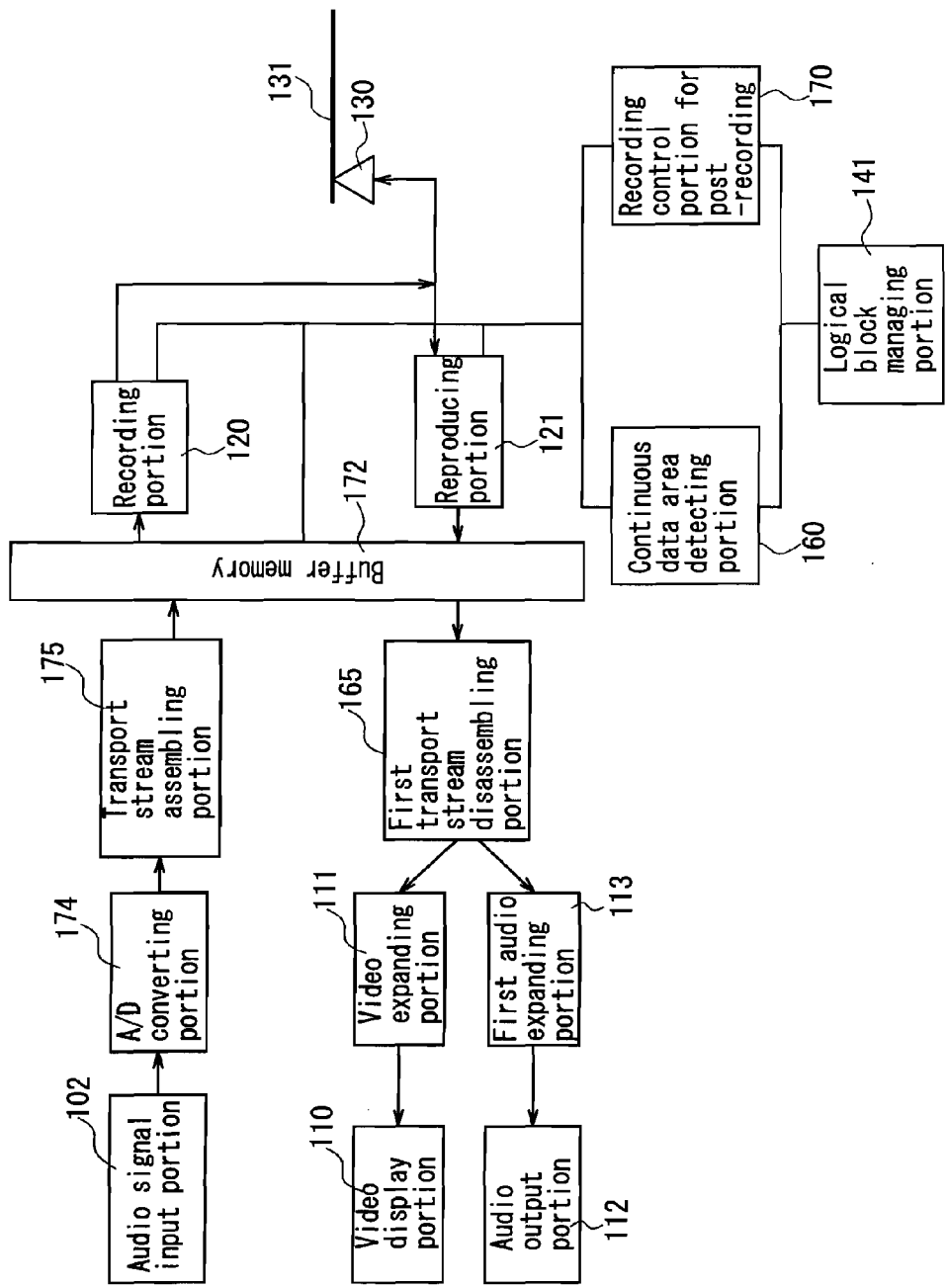
FIG. 12 is a block diagram relevant to post-recording recording in an audio/video information recording/reproducing device according to Embodiment 2 of the present invention.
Figure 13:
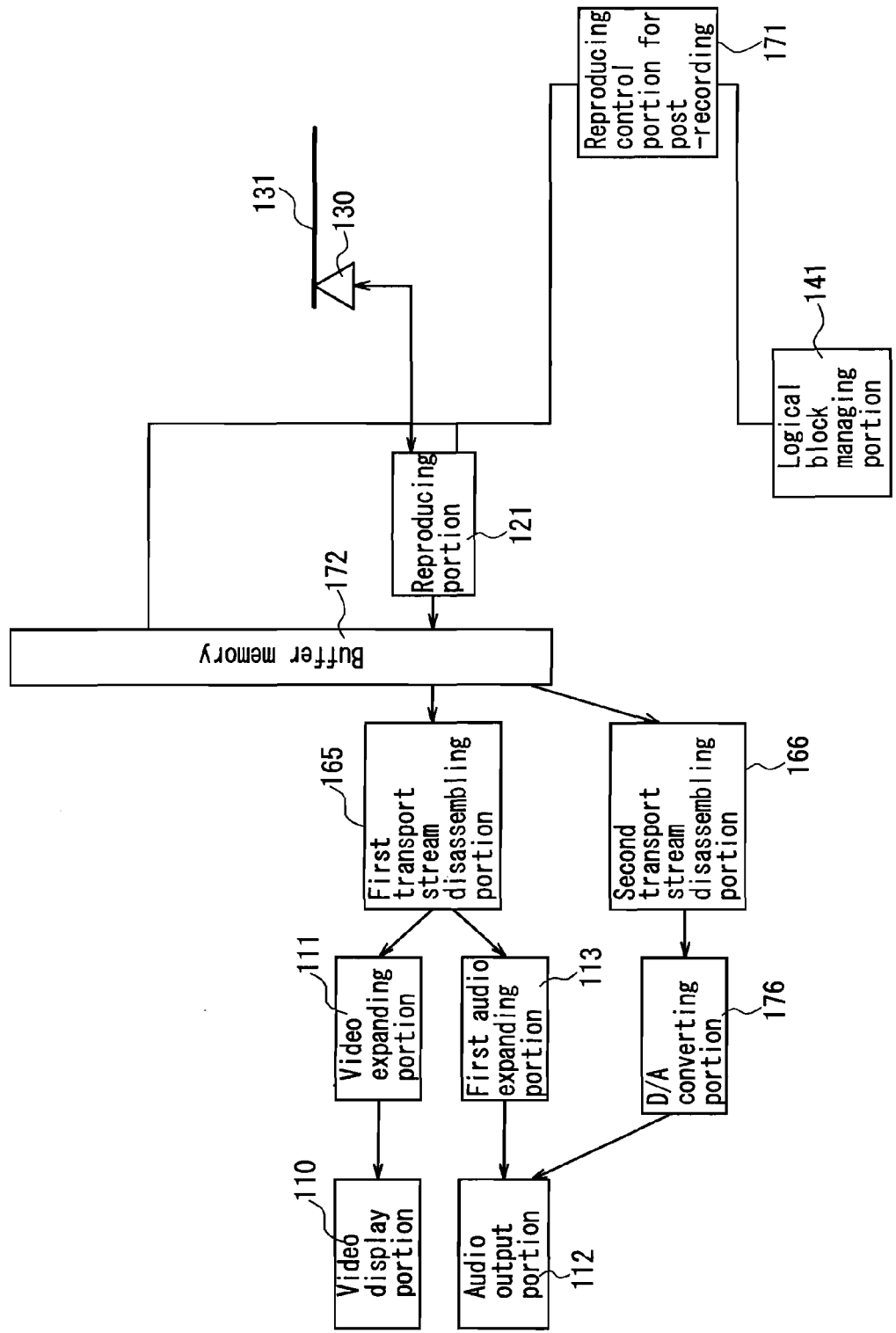
FIG. 13 is a block diagram relevant to post-recording reproduction in an audio/video information recording/reproducing device according to Embodiment 2 of the present invention.

FIG. 12 shows a block relevant to post-recording recording in FIG. 11. FIG. 13 shows a block relevant to post-recording reproduction in FIG. 11.

As described above, since the linear PCM codes are used as the coding format for back audio, the second audio expanding portion 114, which has a large circuit scale, can be replaced by the D/A converting portion 176, which has a small circuit scale.

However, the reproduction rate of the back audio is higher than in the case of the AAC compression, so that it is necessary to adjust the length of the continuous data area based on Equation 7.

The data size of the continuous data area for a back audio file is assumed to be a fixed length, but it may be a variable length having a size of that fixed value or more. However, in this case, it is necessary to extend the minimum data size of the continuous data area for the motion picture file by the length allowing for the maximum time for one movement of the pick-up 130.

Embodiment 3

Next, Embodiment 3 of the present invention will be described. Embodiment 3 is different from Embodiment 1 in that the motion picture file and the back audio file are not reproduced at the same time at the time of post-recording reproduction, and the back audio file previously is mixed in the motion picture file as one transport stream (MIX), and the front audio stream and the back audio stream are decoded in parallel at the time of reproduction.

Figure 14:
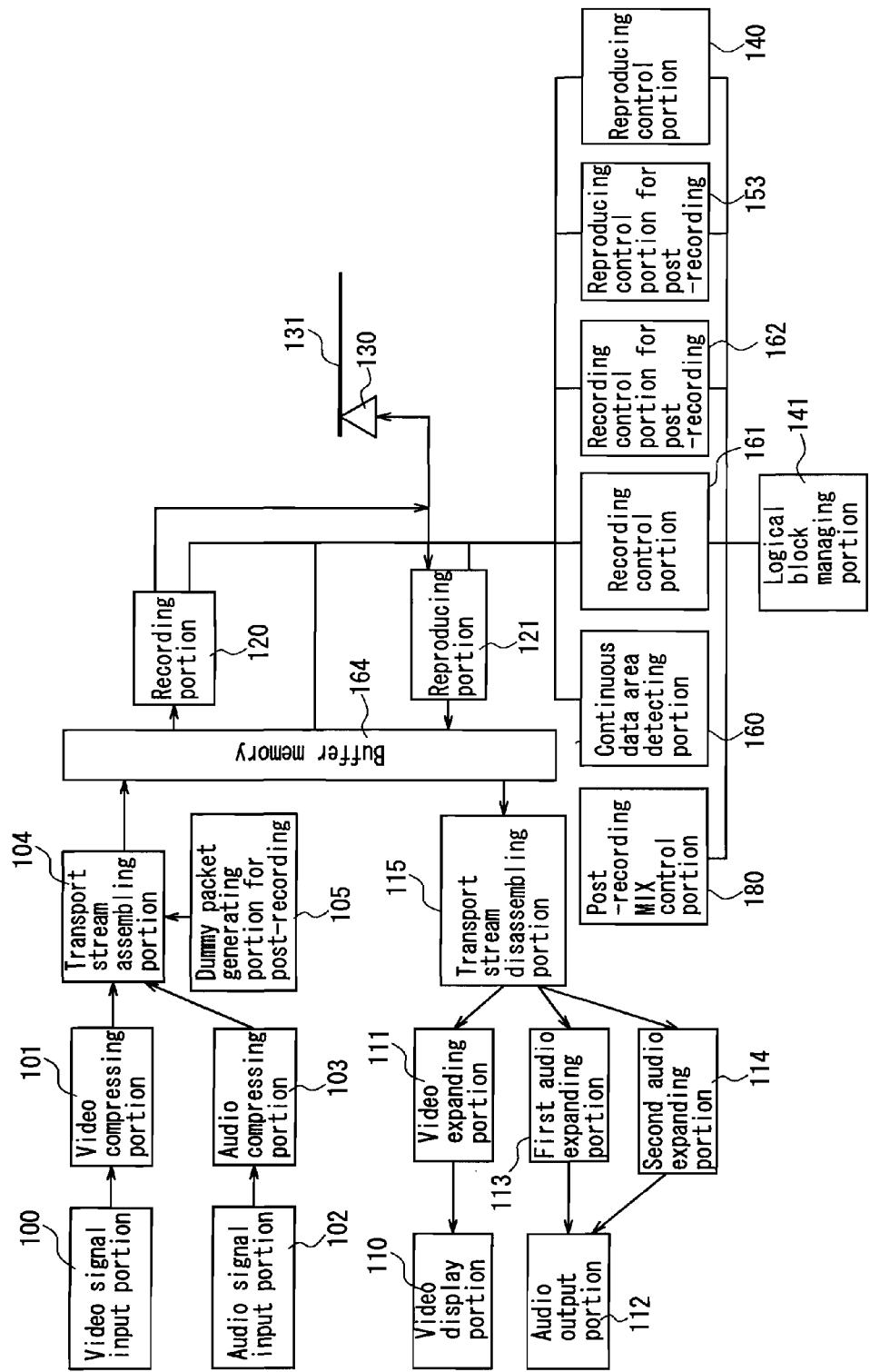
FIG. 14 is a block diagram showing a functional configuration of an audio/video information recording/reproducing device according to Embodiment 3 of the present invention.

FIG. 14 is a block diagram showing a functional configuration of an audio/video information recording/reproducing device according to Embodiment 3 of the present invention. FIG. 14 is different from FIG. 1 in that only one transport stream disassembling portion 115 is included, and a MIX control portion 180 for post-recording is included. In addition, another difference is that the reproducing control portion 153 for post-recording has the same function as that of the reproducing control portion 153 for post-recording of the conventional example. The data reading rate of the reproducing portion 121, the maximum recording/reproducing rate of the transport stream disassembling portion 115, and the maximum movement time of the pick-up 130 during reading operation and writing operation are the same as those of the conventional example.

Figure 15:
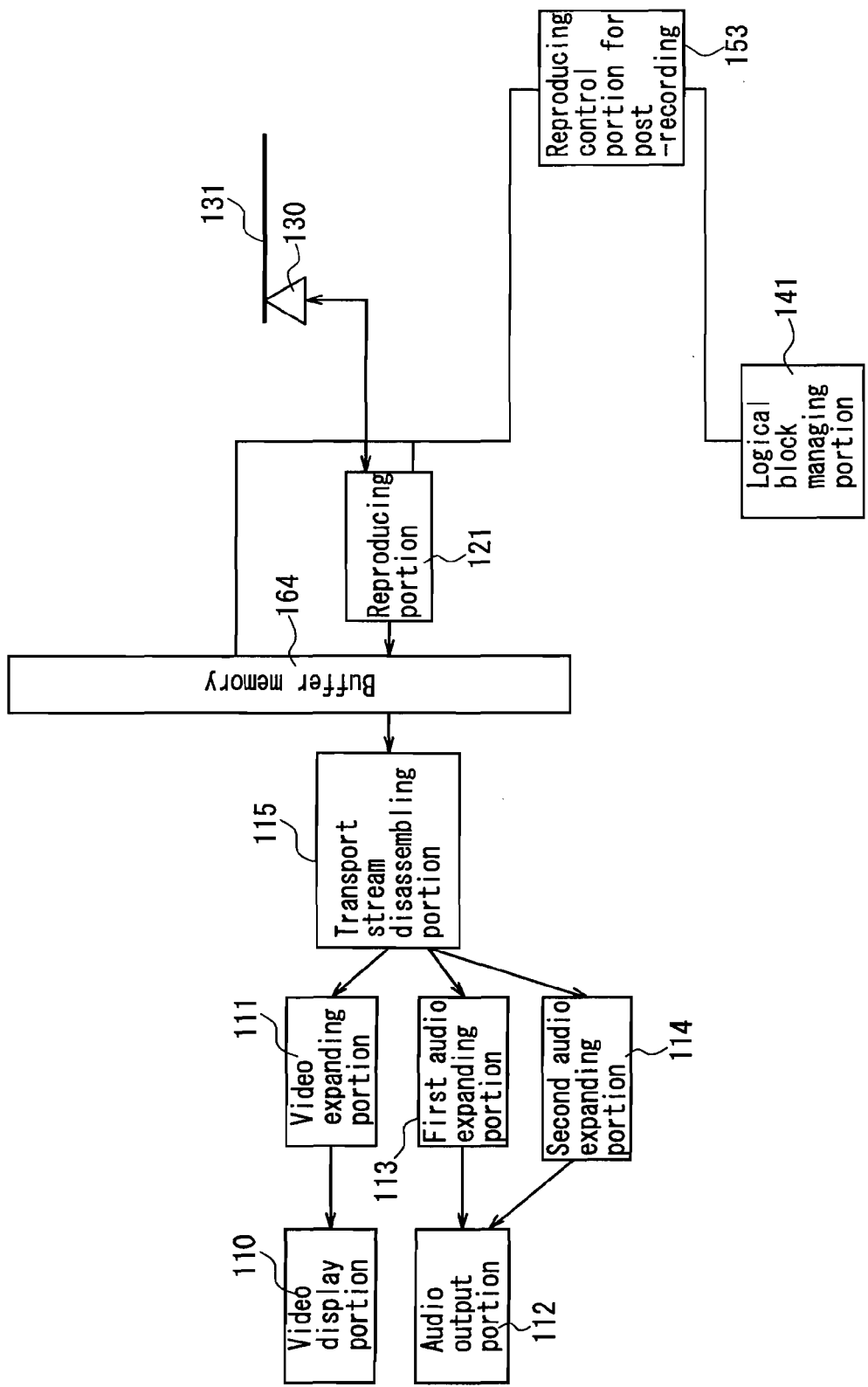
FIG. 15 is a block diagram relevant to post-recording reproduction in an audio/video information recording/reproducing device according to Embodiment 3 of the present invention.

FIG. 15 shows a block relevant to post-recording reproduction in FIG. 14.

For video recording and post-recording recording, the same processes as in Embodiment 1 are performed. Thereafter, the D_TSP in the motion picture file is replaced by the A_TSP in the back audio file, so as to form a transport stream in which the front audio stream and the back audio stream are mixed.

For post-recording reproduction, the motion picture file after mixing is passed through the reproducing portion 121, the buffer memory 164, and the transport stream disassembling portion 115 as shown in FIG. 15. Furthermore, the front audio stream is passed through the first audio expanding portion 113 and the audio output portion 112, and the back audio stream is passed through the second audio expanding portion 114 and the audio output portion 112, so that the two types of audio are reproduced together with video.

Thus, there is no need to manage two files and it is sufficient to manage only one file by creating the motion picture file made of transport streams in which front audio and back audio are mixed in the manner as described above.

Furthermore, the data structures of the motion picture file and the back audio file are of the same transport stream format, so that it is sufficient to replace the D_TSP in the motion picture file by the A_TSP in the back audio file, and therefore it is easy to create a mixed motion picture file. Furthermore, the data structures of the motion picture file and the back audio file are of the same transport stream format, so that a replacement can be easy when outputting the transport stream in which the D_TSP in the motion picture file has been replaced by the A_TSP in the back audio file to a digital interface. Moreover, the data structure of the back audio file is of the MPEG system stream format such as a transport stream, so that even if the audio compression codes (e.g., AAC codes) are different, the back audio file can be handled as a unitary audio file, which makes it easy to handle the back audio file.

Embodiment 4

Next, Embodiment 4 of the present invention will be described. Embodiment 4 is different from Embodiment 1 in that the motion picture file does not contain audio data, and the motion picture file containing only still-images is used for post-recording reproduction. An example in which audio recorded in the audio file is reproduced at the same time while the still-images are switched at a predetermined time interval in the designated order in the manner as in a slide show will be described. The configuration of the audio/video information recording/reproducing device is the same as that of Embodiment 1.

Figure 23:
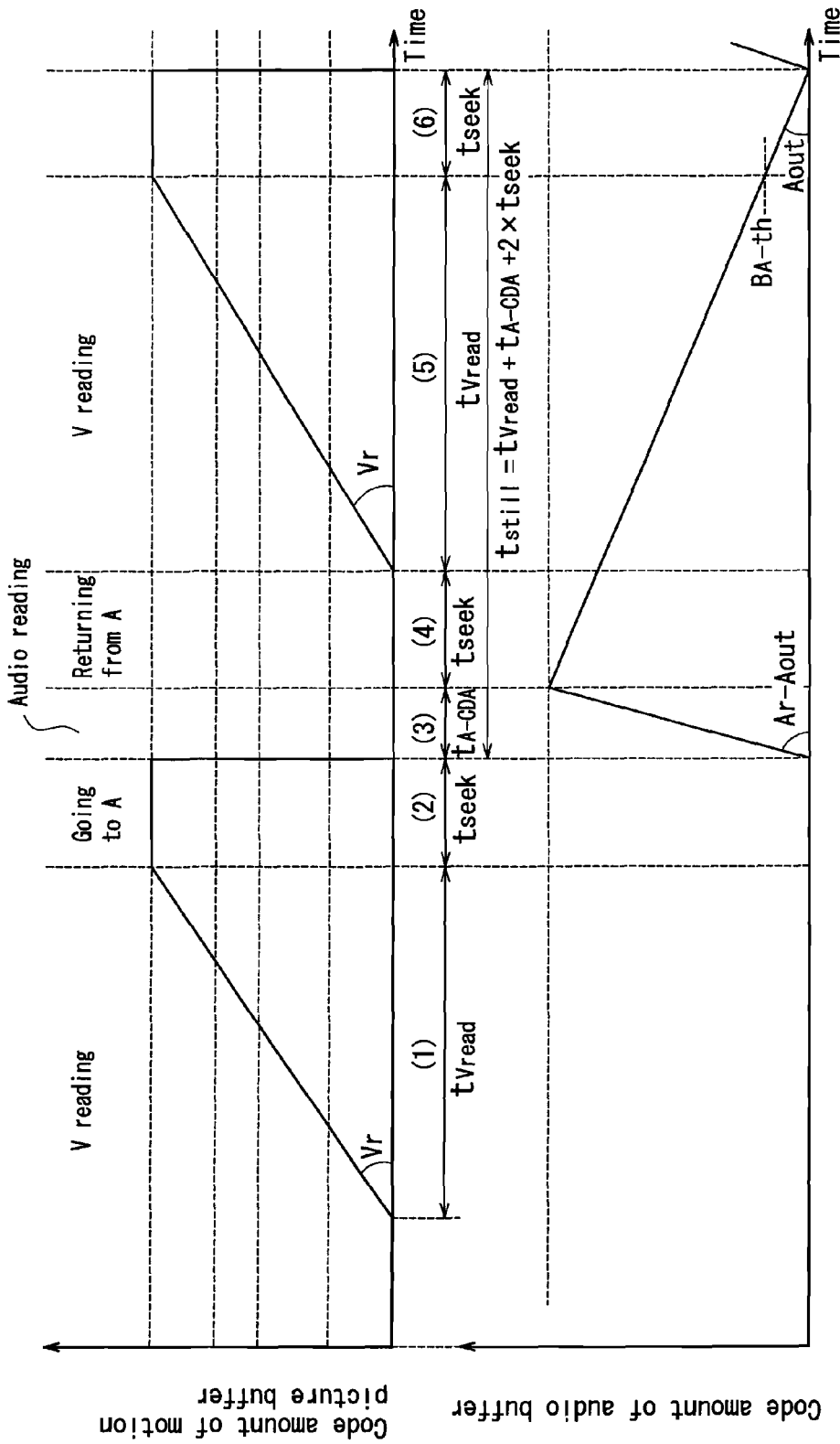
FIG. 23 is a diagram showing the transition of the code amount in a motion picture buffer memory and an audio buffer memory at the time of post-recording reproduction in an audio/video information recording/reproducing device according to Embodiment 4 of the present invention.

FIG. 23 is a diagram showing the transition of the code amount in the motion picture buffer memory and the audio buffer memory at the time of post-recording reproduction in the audio/video information recording/reproducing device according to Embodiment 4 of the present invention. Hereinafter, this embodiment will be described with reference to FIG. 23.

The reproducing control portion 163 for post-recording starts reading of motion picture data from the head of a time period (1). Therefore, data are stored in the motion picture buffer memory at a rate $V_r$. Then, during a time period (2), a seek operation is performed with respect to the audio data. Then, after reading data for one still-image is completed, the still-image is displayed during a time period (3). At the same time, reading data in the audio buffer memory and reproducing the read data are started. Thus, the data amount in the audio buffer memory is increased at a rate of up to Ar-Aout. Then, during a time period (4), the pick-up 130 moves from areas for the audio data onto areas for the video data. During this time period, audio is output at the same time, so that the code amount in the audio buffer memory is decreased at a rate Aout. When the movement of the pick-up 130 ends, reading the video data is started again (a time period (5)). At the time when the data amount in the audio buffer memory reaches $B_{A-th}$, the pick-up 130 on areas for the motion picture file starts to move again onto areas for the audio file (a time period (6)). By repeating the above-described process, the read still-image data are transferred to the transport stream disassembling portion 165 and video is reproduced by the video expanding portion 111 during a display cycle $t_{still}$. Furthermore, during a display cycle $t_{still}$, the read audio data also are reproduced by the first audio expanding portion 113.

Here, the video update interval $t_{still}$, which is a display cycle, can satisfy Equation 9, when $t_{Vread}$ is a time for reading data for one still-image, $t_{A-CDA}$ is a time for reading audio data recorded in a continuous data area having a fixed data size, and $t_{seek}$ is the maximum movement time of the pick-up 130.

$$t_{still} \geq t_{Vread} + t_{A-CDA} + 2t_{seek} \qquad \text{Equation 9}$$

Thus, adding audio to a slide show can be realized easily.

In Embodiment 4, the still-image is assumed to be contained in the motion picture file composed of transport streams, but may be a JPEG file. In this case, a JPEG decoder is necessary.

In Embodiment 4, the update interval of still-images is assumed to be constant, but may be designated individually for each still-image, as long as Equation 9 is satisfied. Furthermore, when the data size of the still-images is different from each other, the update interval may be designated for each still-image, depending on the data size, within the range that satisfies Equation 9.

In Embodiment 4, audio is reproduced while displaying still-images as slides. However, the same is true when recording audio. In this case, needless to say, the reading time for audio data may be replaced by the writing time thereof.

In each embodiment, the storage medium is assumed to be a phase-change optical disk, but is not limited thereto. For example, any recording medium having a disk shape, such as optical disks or hard disks such as DVD-RAM, MO, DVD-R, DVD-RW, DVD+RW, CD-R, and CD-RW, can be used. Furthermore, a semiconductor memory such as a flash memory also can be used.

Similarly, in each embodiment, a pick-up is used as the reading/writing head, but in the case of MO, a pick-up and a magnetic head are used. In the case of hard disks, a magnetic head is used.

In each embodiment, the transport stream may be of a format based on the digital broadcasting standard employing MPEG. For example, the transport stream based on Japanese BS digital broadcasting standard, the transport stream based on the ATSC standard in the U.S., and the transport stream based on the DVB standard in Europe can be used.

In each embodiment, the motion picture file and the audio file are assumed to be constituted by transport streams, but can be constituted by bit streams containing other multimedia information such as program streams or PES streams.

In each embodiment, the logical block is set to 32 kbytes and the sector is set to 2 kbytes, but they may be of any size, as long as the logical block size is a multiple of the sector size. For example, the logical block can be 16 kbytes and the sector can be 2 kbytes. Alternatively, both the logical block and the sector can be 2 kbytes.

In each embodiment, the MPEG2 video compression codes and the AAC compression codes are used as the video compression codes and the audio compression codes, respectively. However, the MPEG1 video compression codes or the MPEG4 video compression codes, and MPEG-Audio compression codes, Dolby AC 3 compression codes, or Twin-VQ compression codes can be used.

In each embodiment, the motion picture file and the back audio file are assumed to be recorded on the same optical disk, but may be recorded on different recording media. For example, the motion picture file can be recorded on an optical disk and the back audio file can be recorded on a flash memory card, and a synthesized file can be recorded on an optical disk. In this case, the occasion of movement of the pick-up decreases, which makes it significantly easy to attain post-recording recording and post-recording reproduction.

In each embodiment, the files are managed by the UDF file system, but may be managed by FAT (file allocation table) or other unique file system.

In each embodiment, in addition to the motion picture file and the back audio file, a third file serving as a file for associating the motion picture file with the back audio file may be recorded. This third file can describe the timing of concurrent reproduction (parallel reproduction) of the motion picture file and the back audio file in the SMIL (Synchronized Multimedia Integration language) whose standardization has been studied in W3C. Thus, the relationship between the motion picture file and the back audio file can be described clearly from the viewpoint of reproduction timing or the like. For example, the start portion of concurrent reproduction can be designated by designating an elapsed time from the head of the video file and an elapsed time from the head of the audio file. Furthermore, even if the motion picture file, the back audio file and the third file are transferred to a personal computer, they can be reproduced, for example, with a SMIL player of application software on the personal computer, by using the SMIL language.

In each embodiment, when recording the back audio file by performing post-recording recoding with respect to a portion of a motion picture file, it is necessary to record time information of the start timing of the post-recording recording in the back audio file, the third file or another fourth file.

In each embodiment, back audio with respect to motion pictures is recorded in the back audio file, but music (BGM or the like) whose timing is not directly associated with the motion pictures may be recorded and reproduced in the same manner as for post-recording reproduction.

In each embodiment, the maximum movement time of the pick-up during reading is the same as that during writing, but may be different. In this case, however, it is necessary to select an appropriate or a larger time as the maximum movement time of the pick-up to obtain the data size (Equations 6 and 7) of the continuous data area or the video update time (Equation 9).

As described above, according to the present invention, it is possible to provide an audio/video information recording/reproducing device that can easily achieve a post-recording function on an optical disk.

The invention claimed is:

1. An audio/video information recording/reproducing device comprising:
   a first reproducing portion that reproduces a first audio/video information which is recorded as a first audio/video data;
   a second reproducing portion that reproduces a second audio/video information which is recorded as a second audio/video data;
   wherein the first audio/video data is constituted by a group of first continuous data areas in which the first audio/video information can be recorded, a size of the first continuous data areas is larger than a size of first physically continuous recording units;
   the second audio/video data is constituted by a group of second continuous data areas in which the second audio/video information can be recorded, a size of the second continuous data areas is larger than a size of second physically continuous recording units; and
   the first audio/video information, in the first physically continuous recording units, can be read out continuously until surplus first audio/video information is obtained in an amount corresponding to a total period of a period four times the time for interrupting a reading/writing of the first audio/video information and a period for reading out one of the second continuous data areas.

2. An audio/video information recording/reproducing device according to claim 1, wherein;

the second audio/video information, in the second physically continuous recording units, can be read out continuously until surplus second audio/video information is obtained in an amount corresponding to the total period of a period three times the time for interrupting a reading/writing of the first audio/video information and a period for reading out one of the first continuous data areas.

3. An audio/video information recording/reproducing device according to claim 2, further comprising:

a concurrent reproducing portion that performs reproduction of the first audio/video information and reproduction of the second audio/video information continuously.

4. An audio/video information recording/reproducing device according to claim 3, further comprising;

a first multimedia stream which includes the first audio/video information; and a second multimedia stream which includes the second audio/video information.

5. An audio/video information recording/reproducing device according to claim 1, further comprising;

a reading/writing head is moved for the period of at least a period three times the time for interrupting a reading/writing of the first audio/video information.

* * * * *